United States Patent [19]

Waterhouse et al.

[11] Patent Number: 5,532,465

[45] Date of Patent: * Jul. 2, 1996

[54] TECHNIQUE FOR LOCATING ELECTRONIC LABELS IN AN ELECTRONIC PRICE DISPLAY SYSTEM

[75] Inventors: Paul Waterhouse, Copetown; John Stevens, Streetsville, both of Canada; George Leibman, Mount Kisco, N.Y.

[73] Assignee: Electronic Retailing Systems International, Inc., Wilton, Conn.

[*] Notice: The term of this patent shall not extend beyond the expiration date of Pat. No. 5,374,815.

[21] Appl. No.: 207,956

[22] Filed: Mar. 8, 1994

Related U.S. Application Data

[63] Continuation-in-part of Ser. No. 31,580, Mar. 15, 1993, Pat. No. 5,374,815.

[51] Int. Cl.[6] .......................... G06K 15/00; G06F 15/24
[52] U.S. Cl. .......................................... 235/383; 235/385
[58] Field of Search .................... 235/383, 385, 235/441; 395/114; 340/825.35; 345/2, 3; 439/589, 590; 211/184

[56] References Cited

U.S. PATENT DOCUMENTS

| | | | |
|---|---|---|---|
| 4,002,886 | 1/1977 | Sundelin | 235/383 |
| 4,346,453 | 8/1982 | Drapeau et al. | 364/900 |
| 4,500,880 | 2/1985 | Gomersall et al. | 340/825.35 |
| 4,783,740 | 11/1988 | Ishizawa et al. | 364/403 |
| 4,821,291 | 4/1989 | Stevens et al. | 375/37 |
| 4,888,709 | 12/1989 | Revesz et al. | 364/518 |
| 4,962,466 | 10/1990 | Revesz et al. | 364/518 |
| 5,019,811 | 5/1991 | Olsson et al. | 340/825.17 |
| 5,111,196 | 5/1992 | Hunt | 340/825.35 |
| 5,172,314 | 12/1992 | Poland et al. | 364/401 |
| 5,198,644 | 3/1993 | Pfieffer et al. | 235/383 |
| 5,241,467 | 8/1993 | Failing et al. | 364/401 |
| 5,245,534 | 9/1993 | Waterhouse et al. | 364/404 |

FOREIGN PATENT DOCUMENTS

| | | |
|---|---|---|
| 299355 | 1/1989 | European Pat. Off. . |
| 9305475 | 3/1993 | WIPO . |
| 9305456 | 3/1993 | WIPO . |

Primary Examiner—Donald T. Hajec
Assistant Examiner—Jeffrey R. Filipek
Attorney, Agent, or Firm—Oppedahl & Larson

[57] ABSTRACT

In a system for displaying prices in a retail store, improved rail arrangements permit improved accuracy in confirming the physical location of an improved display device on one such rail arrangement. A response from the device to a host, or central computer, indicates a particular position of the device on the rail arrangement.

95 Claims, 14 Drawing Sheets

| ZONES | BIT PATTERNS |
|---|---|
| 1 | 1 1 1 0 |
| 2 | 1 1 0 1 |
| 3 | 1 0 1 0 |
| 4 | 0 1 0 1 |
| 5 | 1 0 1 1 |
| 6 | 0 1 1 0 |
| 7 | 1 1 0 0 |
| 8 | 1 0 0 1 |
| 9 | 0 0 1 0 |
| 10 | 0 1 0 0 |
| 11 | 1 0 0 0 |
| 12 | 0 0 0 1 |
| 13 | 0 0 1 1 |
| 14 | 0 1 1 1 |
| 15 | 1 1 1 1 |

| RANGES | BIT PATTERNS |
|--------|--------------|
| 1 | 1 1 1 1 |
| 2 | 0 1 1 1 |
| 3 | 0 0 1 1 |
| 4 | 1 0 1 1 |
| 5 | 1 0 0 1 |
| 6 | 0 0 0 1 |
| 7 | 0 1 0 1 |
| 8 | 1 1 0 1 |
| 9 | 1 1 0 0 |
| 10 | 0 1 0 0 |
| 11 | 0 0 0 0 |
| 12 | 1 0 0 0 |
| 13 | 1 0 1 0 |
| 14 | 0 0 1 0 |
| 15 | 0 1 1 0 |
| 16 | 1 1 1 0 |
FIG. 16
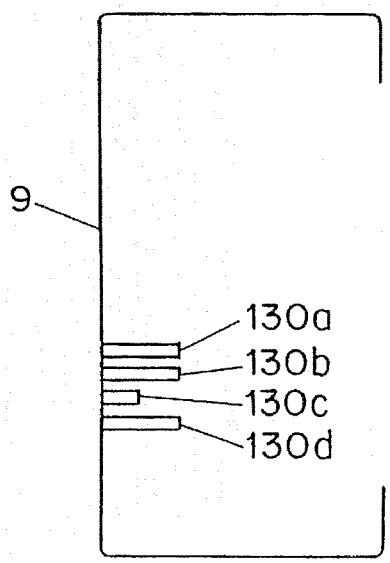
FIG. 17
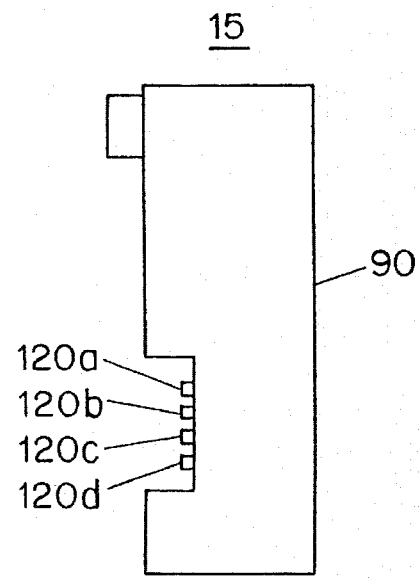
FIG. 18

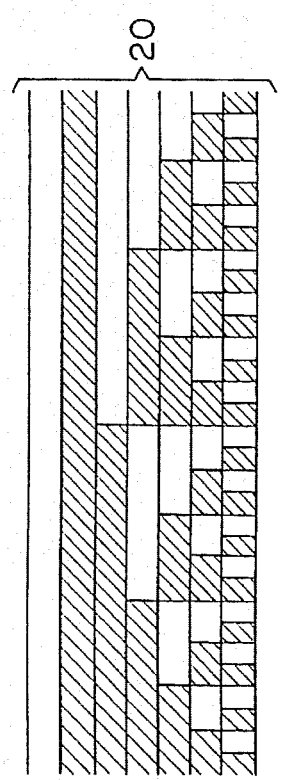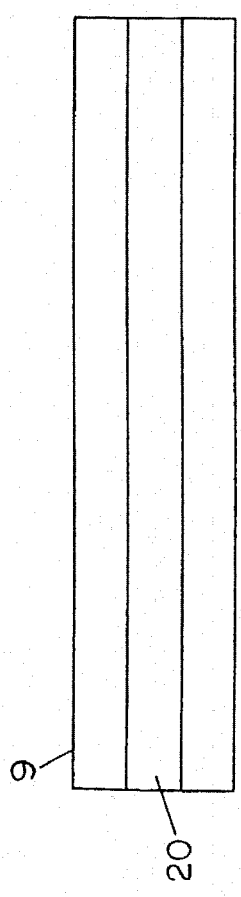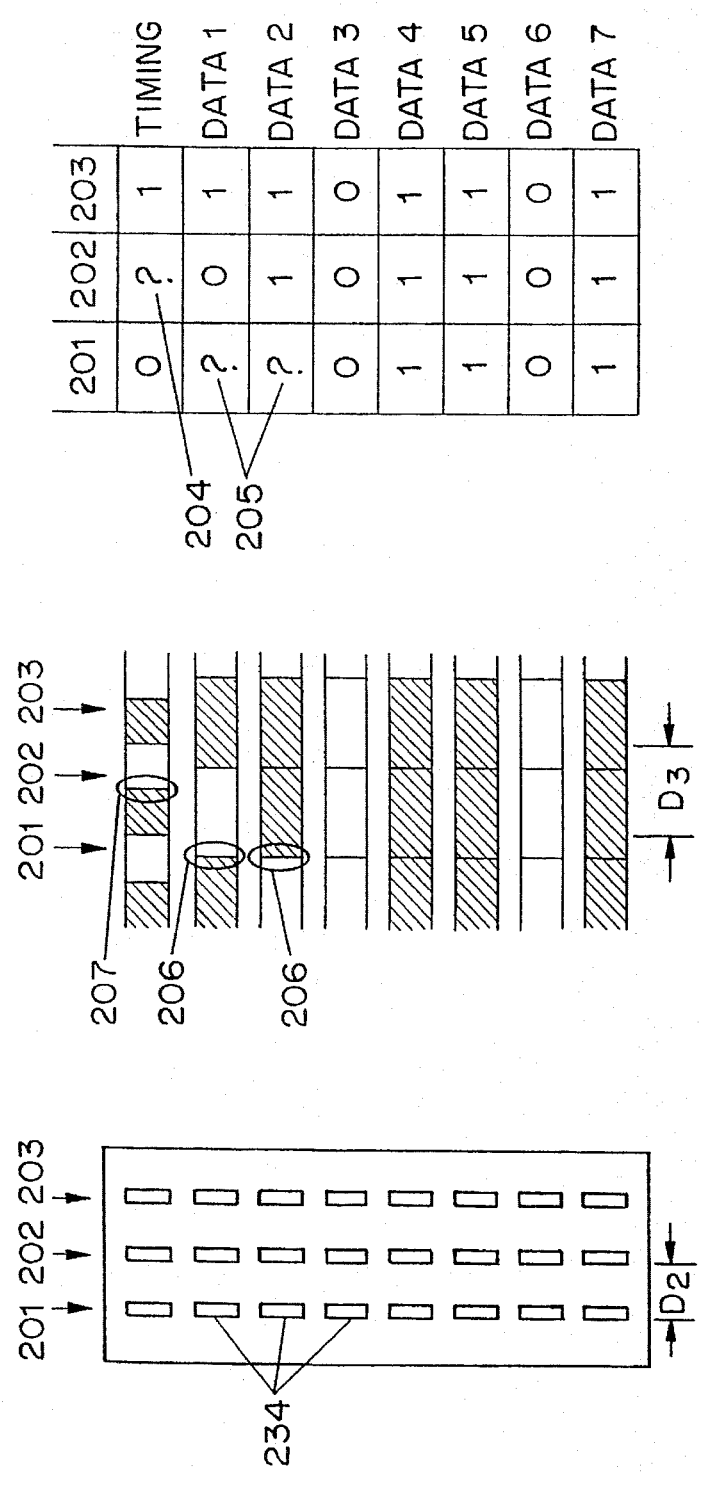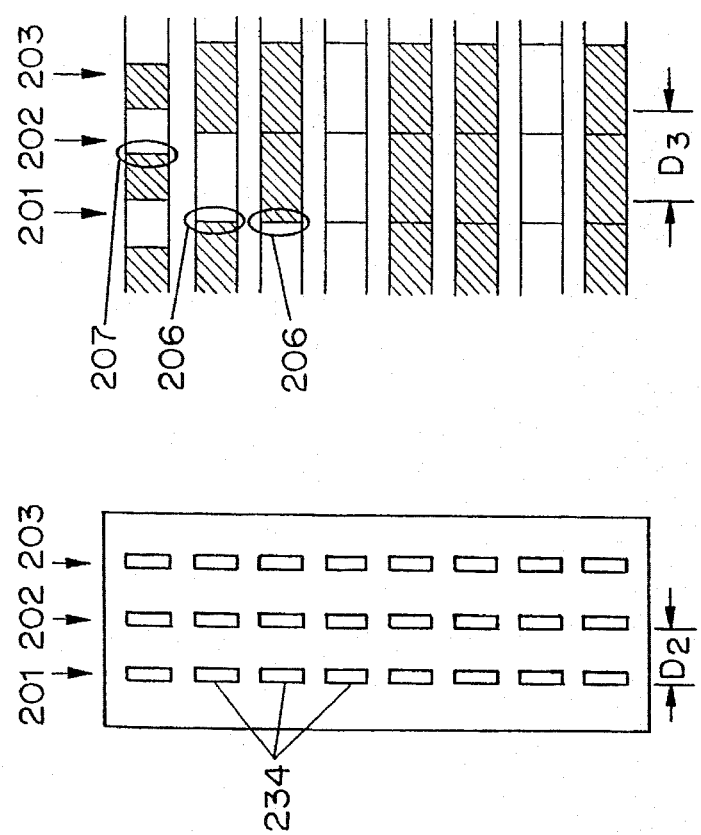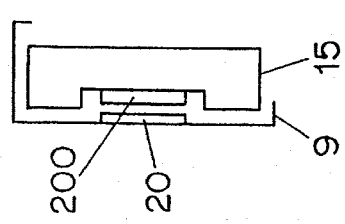

TECHNIQUE FOR LOCATING ELECTRONIC LABELS IN AN ELECTRONIC PRICE DISPLAY SYSTEM

This is a continuation-in-part application of U.S. patent application Ser. No. 08/031,580 U. S. Pat. No. 5,374,815 filed by Paul Waterhouse and John Stevens on Mar. 15, 1993.

TECHNICAL FIELD

The present invention relates to electronic labels and particularly to a technique for detecting displacement of and/or locating such labels in an electronic price display system.

BACKGROUND OF THE INVENTION

Much attention has been given in recent years to systems used in retail stores for displaying goods prices. While manual marking of the prices at the location of the goods, or on the goods themselves, is conventional, attempts have been made to use electronic means, instead, for displaying the prices at the goods location.

Some electronic price display systems have been proposed to employ electronic labels or modules, each typically having a liquid crystal display, for displaying the prices. Buses for power and data are used in such systems to connect many thousands of such labels to a central computer for the latter to communicate with particular ones of the labels to, for example, request changes in their displayed prices. To this end, the labels are equipped with connectors so that they can be snapped onto one of many locations along rails which include the buses and which run along the edges of the store shelves. The connectors also provide the labels with electrical connections to the central computer through the buses.

Experience has shown that physical placement of products within a store has, oftentimes, enormous influence on the sales of the products. Factors including shelf height and the number of product facings along a shelf can be of great significance to store planners. Thus, it is important for a store planner to ensure that the "plan-o-gram" of the store, which is a plan showing product locations on shelves, is faithfully adhered to. However, deviations from the plan-o-gram could often result from accidental or intentional misplacement of the labels by store personnel, customers or others.

A scheme has been proposed for detecting such misplacement by monitoring power outage of the labels, assuming that a misplaced label has been removed from its power before relocated. Undesirably, such a proposed scheme is not capable of detecting displacement of a label along the rail without interrupting its power. A fortiori, it is not capable of determining the location of the displaced label.

SUMMARY OF THE INVENTION

The invention overcomes the prior art limitation by including an interface along a rail on which a label is mounted. The label is operable to generate different signals. The rail interface is capable of causing the label to generate a signal indicative of the region within the rail where the label is mounted, and a different signal when the label displaces by more than a predetermined distance along the rail.

In response to a poll from the central computer for determining any displacement of the label, the latter generates a signal indicative of the current region within the rail where it is located. Based on this signal, and knowledge of different signals being associated with different regions within the rail, the central computer can effectively determine the location of the label on the rail and detect any displacement of same.

BRIEF DESCRIPTION OF THE DRAWING

In the drawing,

FIG. 16 tabulates various bit patterns generated by the label of FIG. 12 corresponding to the different ranges in FIG. 15;

FIG. 17 is a cross-section of an alternative shelf rail used in the fourth embodiment in accordance with the invention;

FIG. 18 is a side view of an alternative label used in the fourth embodiment in accordance with the invention;

FIG. 19 is a front view of a rail including a sensing region 20;

FIG. 20 is a cross section of a rail in a capacitively-sensed version of the invention;

FIG. 21 is a close-up view of a part of one embodiment of a sensing region 20;

FIG. 22 is a plan view of a capacitance sensor of a label;

FIG. 23 shows a portion of a sensing region 20 and its position relative to a sensor such as that of FIG. 22;

FIG. 24 shows the data output for one set of sensors such as those of FIG. 22 when juxtaposed with a sensing region such as that of FIG. 23;

Throughout the figures of the drawing, unless otherwise stated, the same reference numerals and characters are used to denote like features, elements, components or portions of the illustrative embodiments.

DETAILED DESCRIPTION

Figure 1:
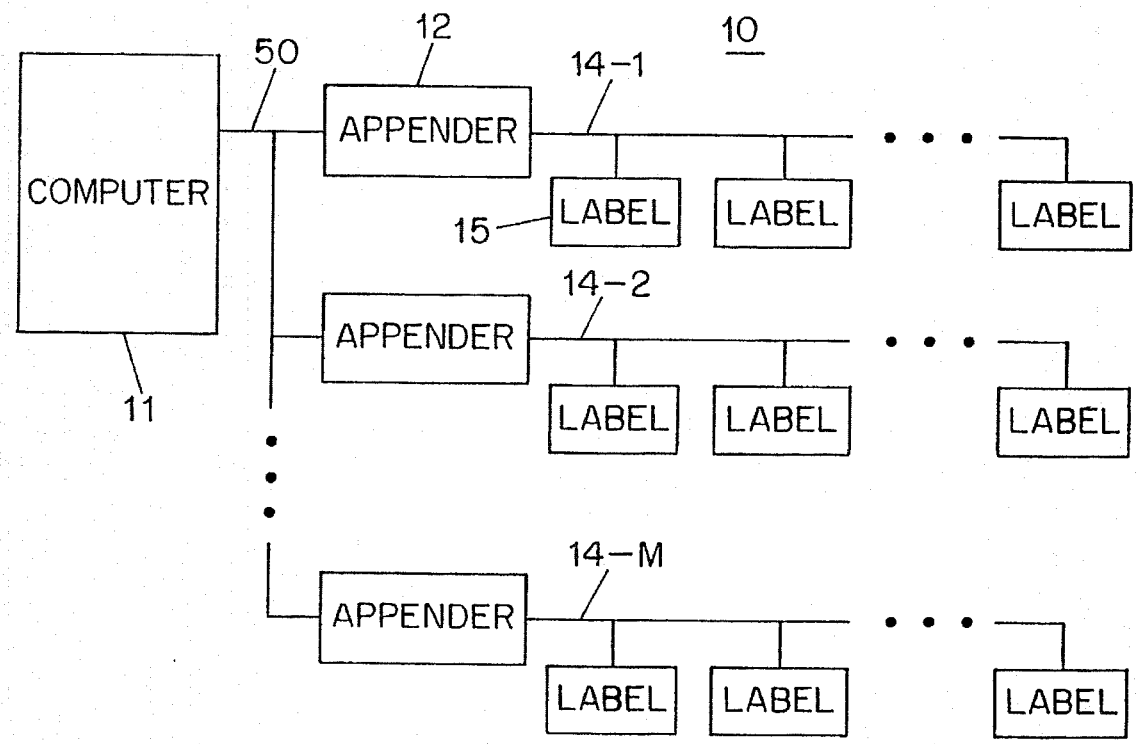
FIG. 1 is a block diagram of an electronic price display system embodying the principles of the invention.

FIG. 1 illustrates an electronic price display system 10 embodying the principles of the invention. System 10 may be employed in a retail store where goods for sale are placed on shelves. In FIG. 1, computer 11, which may be a conventional microcomputer with appropriate bus interface circuitry, is electrically connected to buses 14-1, 14-2 . . . , and 14-M in a multidrop arrangement, where M is an integer whose value is determined by a store planner. Each of these buses runs along the rail of a store shelf in the retail store.

Figure 2:
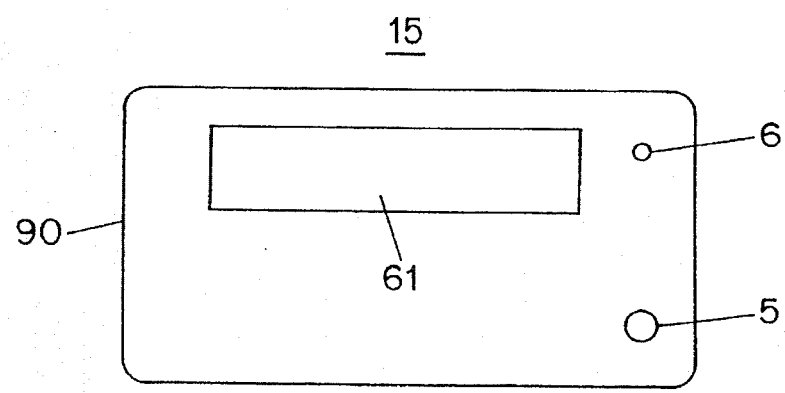
FIG. 2 is a front view of a label used in the system of FIG. 1.
Figure 3:
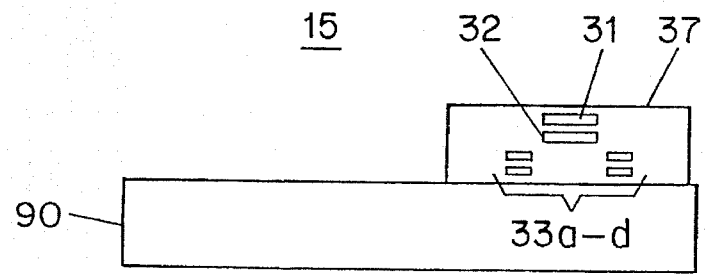
FIG. 3 is a top view of a label used in the system of FIG. 1.

As shown in FIG. 1, a myriad of labels are electrically connected to the buses. One such label is label 15 which is electrically connected to bus 14-1 in a manner to be described. In this illustrative arrangement, computer 11 can communicate with the labels through their respective buses. In addition, a multiplicity of appenders are electrically connected between computer 11 and the labels. Specifically, one appender is connected to each bus between computer 11 and the labels of that bus. It should be pointed out that all of the labels are structurally identical to one another, differing only in their bus addresses which are preassigned thereto for identification purposes. Similarly, all of the appenders are structurally identical to one another, differing only in their respective bus addresses. Bus 50 provides a bidirectional communication path between computer 11, also sometimes called a host, and an appender. Illustratively, appender 12 is electrically connected in such a manner to bus 50. In one embodiment there is an appender for each four-foot section of shelf rail in the store. For the purpose of the present discussion, it suffices to know that the function of an appender in system 10 is to append its bus address to a message to computer 11 sent by a label on the same bus as that appender. The appended bus address enables computer 11 to identify which bus the label that sent the message is on. FIG. 2 provides the front view of label 15. It comprises display 61 which is, for example, of liquid crystal type, light emitting diode (LED) 6 which is controllable by the label, and push-button 5 whose function is described hereinbelow. In addition, case 90 provides mechanical interconnection of the various parts of label 15. FIG. 3 provides the top view of label 15. As shown in FIG. 3, label 15 has connector 37, whereby the label can be mechanically snapped onto one of the many locations (not shown in FIG. 3) on the rail to be electrically connected to bus 14-1. On connector 37, springy contacts 31 and 32, and four individual terminals 33a through 33d permit reliable electrical connection of label 15 of FIGS. 2 and 3 to the bus.

Figure 4:
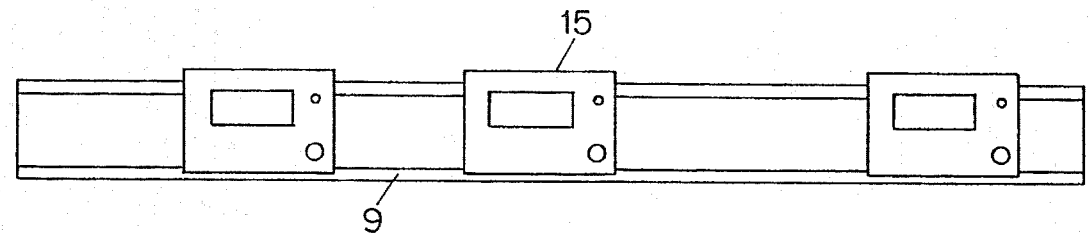
FIG. 4 is a front view of a portion of the system of FIG. 1, including a shelf rail and a plurality of labels in accordance with the invention.

FIG. 4 illustrates a physical disposition of label 15 and other labels on bus 14-1 on rail 9. Thus, label 15 may be used to display the prices of goods close thereto, which prices are communicated to it from computer 11 (not shown in FIG. 4).

Figure 5:
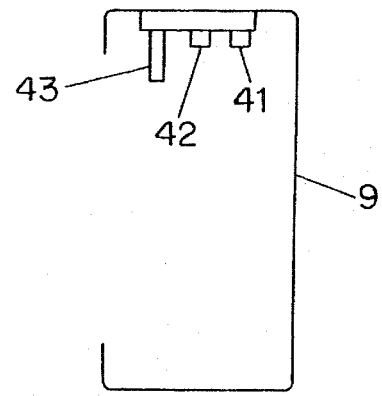
FIG. 5 is a cross-section of the shelf rail of FIG. 4.

FIG. 5 shows a cross-section of rail 9. Conductor 41, conductor 42 and etched board 43, which has on its surface a metallic strip (not shown in FIG. 5) in accordance with the invention, run along the length of rail 9 and are positioned so as to be respectively connected to contact 31, contact 32 and terminals 33a–33d of label 15 of FIG. 3. Etched board 43 is a printed circuit board of conventional mechanical construction having, on each of its two sides, a metallic surface which may be etched in a standard way to realize metallic strips of different patterns. The patterns of the metallic strips used in the present embodiment will be described hereinbelow.

Figure 6:
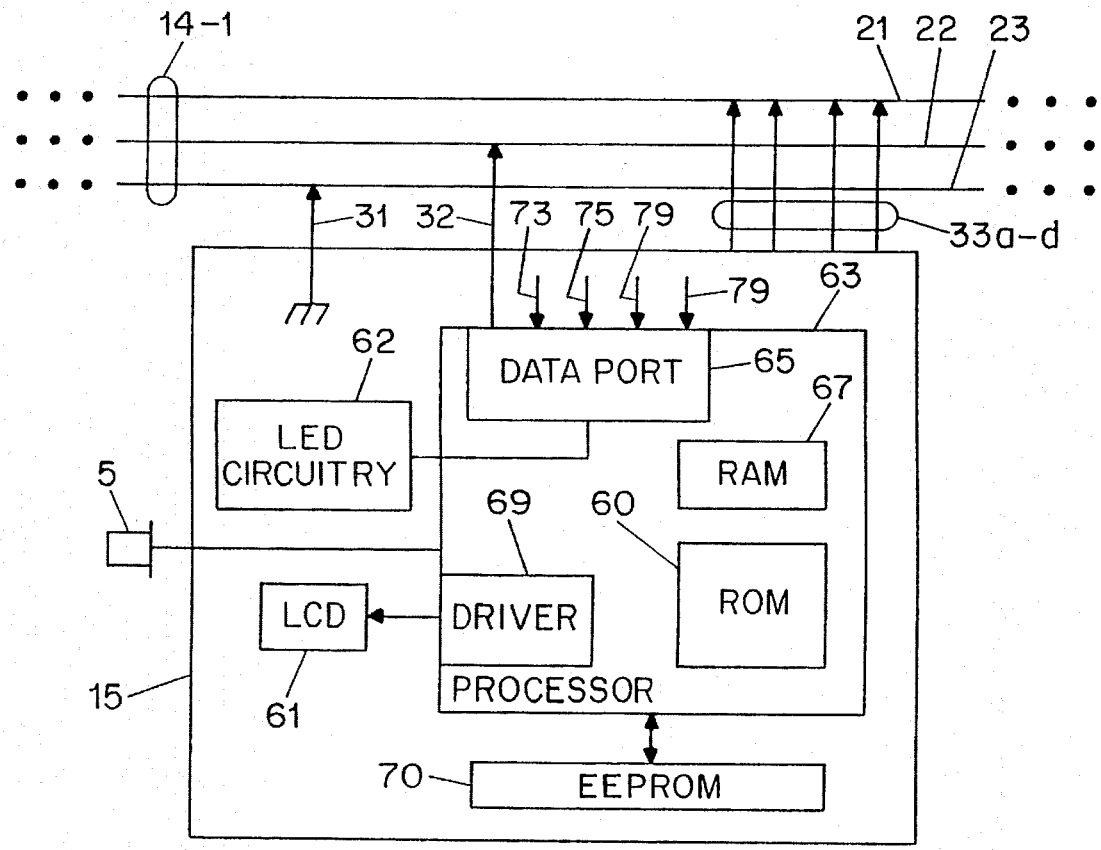
FIG. 6 is a block diagram showing detailed connection between a label of FIGS. 2 & 3 and a bus in the system of FIG. 1.

FIG. 6 shows detailed connections of label 15 to bus 14-1. Illustratively, bus 14-1 comprises power line 21, data wire 22 and ground wire 23 which are, respectively, physically realized as a metallic strip on etched board 43 to be described, conductor 42 and conductor 41 of rail 9 of FIG. 5. Specifically, line 21 transports electrical power from computer 11 (not shown in FIG. 6) to label 15 and other labels on bus 14-1; wire 22 transports data between computer 11 and same; and wire 23 provides a ground or common line between computer 11 and the same.

Central to label 15 is processor 63 which, in this illustrative embodiment, comprises microprocessor LC5851N manufactured by Sanyo Electric Co., Ltd. Processor 63 includes, inter alia: data port 65, read only memory (ROM) 60, random access memory (RAM) 67, and liquid crystal display (LCD) driver 69. A full description of the functions and specifications of the microprocessor LC5851N may be found in a manual No. 3341, which is made available by Sanyo Electric Co., Ltd. Semiconductor Overseas Marketing Division.

ROM 60, programmed permanently at the time of manufacture, contains a monitor program which orchestrates the basic operation of label 15 to perform different functions required thereof. One of these functions is to communicate messages with computer 11 asynchronously through springy contact 32. To this end, each message communicated between computer 11 and label 15 is sent to or retrieved from RAM 67 through the data port 65. The processor 63 properly formats the output messages in a standard serial protocol and recognizes the input messages in that same protocol. Wires 73, 75, 77 and 79 which are to be described are connected to an input of data port 65.

EEPROM 70, also connected with processor 63, contains the identification of label 15 which represents its unique address on the bus in electronic price display system 10. EEPROM 70 preferably is a serial-in serial-out shift register memory, offering the advantage of a small pin count in its connection with processor 63. The unique identification is programmed by a several step process—the address is accumulated in RAM 67, and then stored in EEPROM 70, in response to a specific instruction received over the bus. It is anticipated that for a given label 15, the specific instruction would be given only once, so that the unique identification remains unchanged during the life of the label. Alternatively, the unique identification could be store in some other form—jumpers in the printed wiring board of the label, or masked contents of ROM 60 being two examples.

While EEPROM 70 is shown as a separate piece part from processor 63, one skilled in the art will appreciate that one could, without departing from the scope of the invention, employ a processor with built-in EEPROM instead.

Other types of memory could be used instead of those described above. A battery-backed RAM could be used, for example, to store some or all of what is described above as stored in EEPROM. The processor's stored program could be in EEPROM, EPROM, OTPROM, or battery-backed RAM, for example, rather than the ROM described above. The messages from computer 11 through data wire 22 to processor 63 may contain price information such as the prices of goods, price per unit of goods, etc. Upon receiving such messages in RAM 67, the program therein extracts the price information, stores it in EEPROM 70, and provides it to LCD driver 60. This driver, in a standard way, provides electrode voltage levels so that the price or other information is displayed by LCD 61 which is of convention design.

As mentioned before, power line 21 provides power to label 15 through terminals 33a–33d. The power is used, for example, to power LED 6 (not shown in FIG. 6) supported by conventional LED circuitry 62. Push-button 5 is a conventional switch for allowing a customer to change the displayed information from, for example, the price of the goods to their unit price. Push-button 5 when pushed creates an electrical signal level to processor 63. The program within ROM 60 polls the button periodically for detecting any such pressing of the button. Upon detection of the pressing of the button 5, the program retrieves alternative price information from EEPROM 70 or RAM 67 to be displayed by LCD 61. FIG. 6 also shows the connection of ground wire 23 to label 15 through contact 31.

Figures 7, 8B:
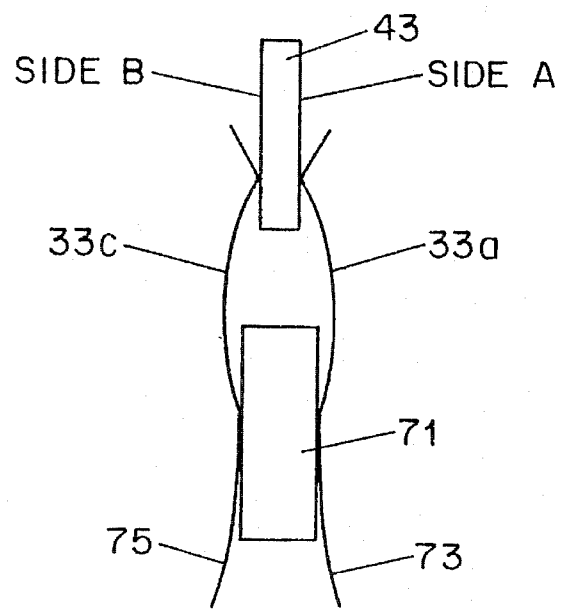
FIG. 7 shows in detail the connection between a pair of terminals extending from the label of FIGS. 2 & 3 and an interface of the bus of FIG. 6.
FIG. 8B tabulates various bit patterns generated by the label of FIGS. 2 & 3 corresponding to different zones of the interface of FIG. 8A.

Experience has shown that, in a retail store, physical placement of products may have enormous influence on the sales of the products. Factors including shelf height for a product, and the number of product facings along a shelf can be of great significance to store planners. Thus, it is important for a store planner to ensure that a "plan-o-gram" of the store, which is a plan showing product locations on shelves, is faithfully followed. However, deviations from the plan-o-gram could often result from accidental or intentional misplacement of the labels by store personnel or customers. Thus, it is desirable to remedy the misplacement or relocation of the labels as expeditiously as possible. By appending its bus address to messages from a label to computer 11, the above-described appender can assist computer 11 to detect relocation of the label when such relocation is from the service area of one appender to that of another. Such detection is achieved by monitoring any change in the appended bus addresses of the messages sent out by the label. However, using appenders without more, computer 11 will not detect displacement of a label if the displacement happens to remain within the physical region served by a given appender. That is, lateral displacement of a label along a rail will not give rise to detection by computer 11 because the appended bus address will remain unchanged. A fortiori, the location of the displaced label on the rail cannot be determined by computer 11. In accordance with the invention, in order to detect the lateral displacement of label 15 along rail 9 or to determine the lateral position of the label, power line 21 is designed in such a way that all or a subset of terminals 33a through 33d of the label are in electrical contact therewith along the rail. FIG. 7 shows terminals 33a and 33c forming a terminal-pair to provide a SIMM type contact for connecting label 15 to board 43 from its side A and side B, respectively. As shown in FIG. 7, terminal-pair 33a & 33c securely clasps onto board 43 at one end and is permanently fixed onto non-conductor 71 at the other end. Non-conductor 71 which resides within connector 37 (not shown in FIG. 7) has wires 73 and 75 thereon electrically connecting terminals 33a and 33c, respectively, to label 15. With this arrangement, terminals 33a and 33c conduct electrical power, if any, to label 15 through the respective wires. Similarly, terminals 33b and 33d (not shown in FIG. 7) together form another terminal-pair to provide another SIMM type contact extending from non-conductor 71 for clasping onto board 43 from its sides A and B, respectively. Similar to wires 73 and 75, wires 77 and 79 (not shown in FIG. 7) respectively connect terminals 33b and 33d to label 15.

Figure 8A:
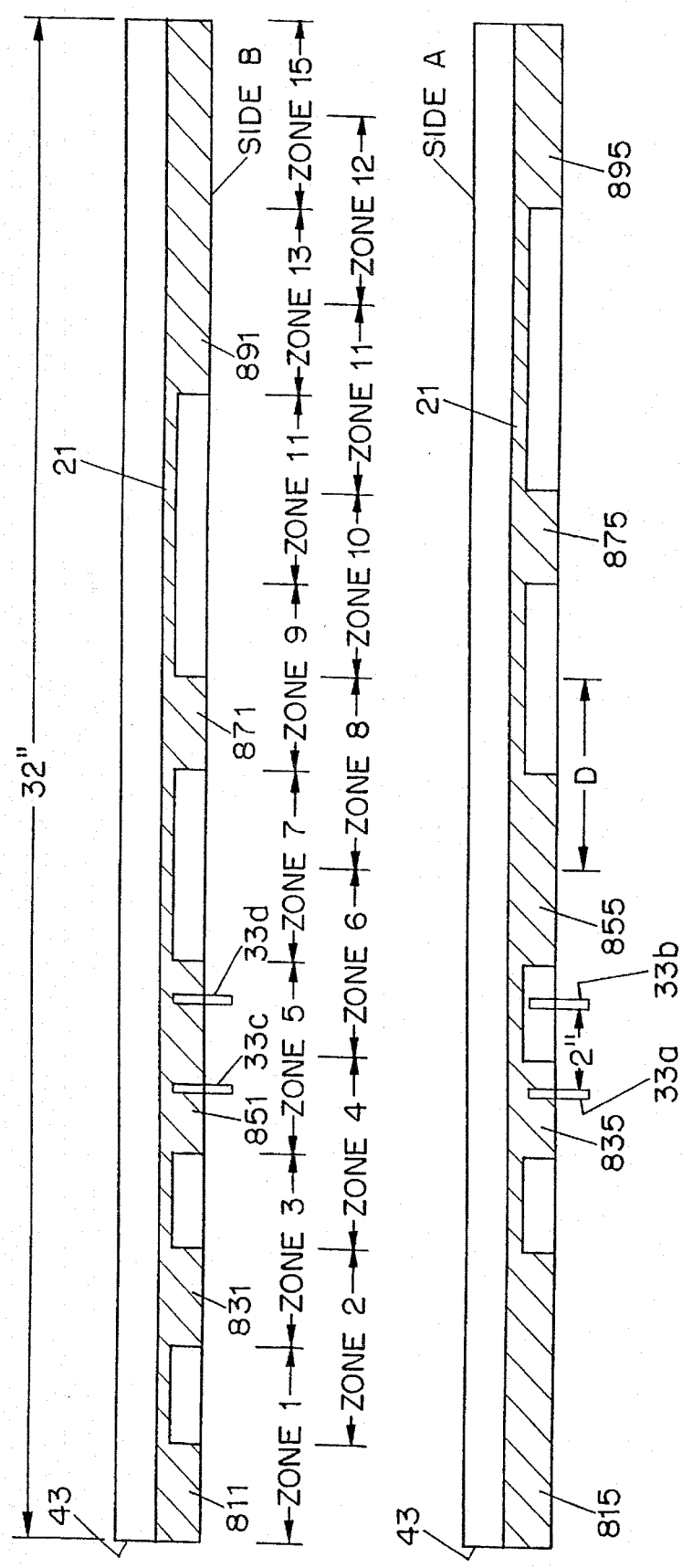
FIG. 8A shows in detail the interface of FIG. 7 and the detailed connection between the terminals of the label of FIGS. 2 & 3 and such an interface.

As mentioned before, line 21 is physically realized as metallic strips of particular patterns on etched board 43. FIG. 8A illustrates such metallic strips on side A and side B of etched board 43. As shown in FIG. 8A, the shaded part of each side of board 43 comprises a metallic strip and is conductive of power. On the other hand, the unshaded part of board 43 is non-conductive. The metallic strips have a plurality of metallic projections or contacts, namely, metallic contacts 811, 815, 831, 835, 851, 855, 871, 875, 891 and 895, for interfacing line 21 with terminals 33a through 33d. It is noteworthy that the sizes of these metallic contacts are not fixed.

In this illustrative embodiment, each metallic strip is 32 inches long. Within the metallic strips, metallic contact 811 is two inches long, metallic contact 815 six inches long, contact 831 two inches long, contact 835 two inches long, contact 851 four inches long, contact 855 four inches long, contact 871 two inches long, contact 875 two inches long, contact 891 eight inches long, and contact 895 four inches long. Terminal-pair 33a & 33c and terminal-pair 33b & 33d are separated by a distance of two inches. (It should be noted at this point that, throughout this disclosure, the distance between any two items is measured from the center of an item to that of the other.) All or a subset of terminals 33a–33d come in contact with the metallic contacts of line 21 and obtain power or a high voltage level therefrom. In this instance, all of these terminals except terminal 33b touch part of some metallic contacts and experience a high voltage.

The voltage levels of terminals 33a through 33d are conducted to data port 65 through wires 73, 75, 77 and 79.

A resident program in EEPROM 70 of label 15 is in place to direct processor 63 to generate a binary bit pattern of 1's and 0's in response to the respective voltage levels at data port 65. For example, processor 63 is programmed to translate a high voltage level conducted from a terminal to a binary bit 1, and an absence of such a high voltage level to a binary bit 0. Thus, in this instance, the resident program generates a binary bit pattern 1011 corresponding to terminals 33a through 33d contacting line 21 in the above-described manner.

In accordance with the invention, line 21 is designed in such a way that terminals 33a–33d when placed within various zones on board 43 cause different bit patterns to be generated by processor 63 within the label. To this end, the distance between any two neighboring metallic contacts on line 21 which is generically denoted D is made unequal (i.e., the metallic contacts on line 21 are unevenly spaced). In fact, D varies in such a way that a different bit pattern is guaranteed to engender whenever the set of terminals 33a–33d displaces more than a predetermined distance. With the particular patterns of the metallic strips as in FIG. 8A, fifteen zones are identified on board 43. These zones are denoted zones 1 through 15 in FIG. 8A and overlap one another. In this illustrative embodiment, each individual zone is four inches long and associated with a different bit pattern. When the set of terminals 33a–33d is completely placed within a particular zone, it causes the bit pattern associated therewith to be generated. It can be shown that, here, any displacement of the terminal set 33a–33d of more than two inches necessarily translates it into a different zone corresponding to a different bit pattern. FIG. 8B tabulates various bit patterns corresponding to zones 1 through 15 of FIG. 8A. For example, as in this instance, terminals 33a–33d are placed completely within zone 5 which corresponds to the bit pattern 1011 as mentioned before. It is noteworthy that the bit pattern 0000 is not in use in the present embodiment since at least one of terminals 33a–33d is required to be in electrical contact with line 21 to obtain power for label 15. Based on the discussion heretofore, it will be appreciated that a person skilled in the art can vary the size of the above-described zones by using a different number of terminals on label 15, which number determines the number of different bit patterns or distinct zones on rail 9. Moreover, the person skilled in the art can also proportionally enlarge or reduce the size of the illustrative metallic strips to satisfy his/her particular size requirements.

Computer 11 contains a look-up table akin to a plan-o-gram which comprises a list of individual zones on each rail identified by the 4-bit patterns which are associated with various labels identified by their bus addresses in the retail store. In addition, the look-up table also contains information about the locations of the respective zones. This information comprises a compilation of distances measured from a reference point of the rail, for example, an end of the rail, to the beginnings and ends of the respective zones. Among other things, computer 11 periodically polls the labels in system 10 for the 4-bit patterns to determine whether the labels are indeed in their supposed zones. Referring back to FIG. 6, for example, in response, label 15 generates a 4-bit pattern corresponding to the respective voltage levels of terminals 33a–33d contacting board 43, in accordance with the aforementioned resident program in EEPROM 70. This 4-bit pattern along with the bus address of label 15 is transmitted thereby in an appropriate protocol to computer 11 through data port 65 via data wire 22. Continuing the example, upon receiving the 4-bit pattern and the bus address from label 15, computer 11 checks the received information against the look-up table. If computer 11 determines that the received 4-bit pattern should not be associated with the bus address of label 15, it assumes that label 15 has been displaced from its supposed zone. As a result, computer 11 issues a warning about the displacement. Such a warning, for example, may be effected by having computer 11 return a command to label 15 via data wire 22, causing LED 6 on label 15 to flash so as to alert the store personnel to correct any unwanted displacement. Alternatively, computer 11 may generate an exception report in a print form identifying the displaced label, and the location of the range which it is in based on the received 4-bit pattern.

Figure 9:
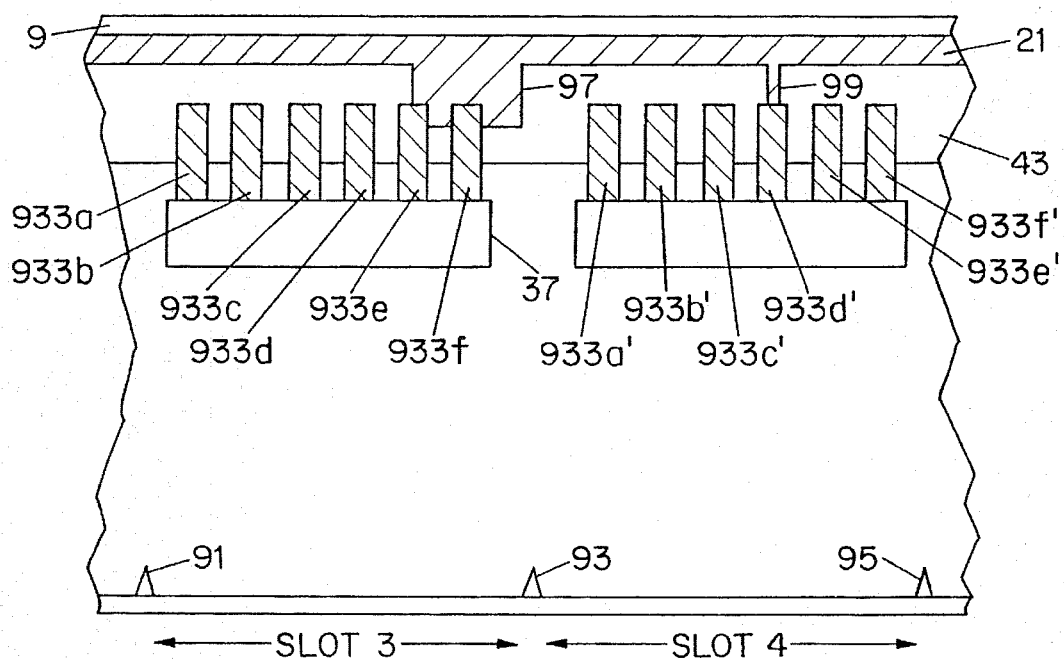
FIG. 9 illustrates a second rail arrangement in accordance with the invention wherein the rail is partitioned into a plurality of slots and only one label is allowed to be placed within each slot.

A second embodiment involving the use of mechanical stoppers on rail 9 will now be described. In this embodiment, the mechanical stoppers are employed to partition rail 9 into a multiplicity of slots or regions. FIG. 9 shows a section of rail 9 wherein mechanical stoppers 91 and 93 delimit a slot numerically denoted 3, and stoppers 93 and 95 delimit another slot numerically denoted 4. Unlike the above-described zones, the slots here do not overlap one another. Also unlike the previous embodiment, only one side of board 43 in FIG. 9 has a metallic strip of a particular pattern and the other side thereof is completely nonconductive. There are six, rather then four as in the previous embodiment, terminals extending from connector 37 of label 15. Each terminal has a SIMM type contact for clasping onto board 43. Thus, except for the terminal arrangement, label 15 in the previous embodiment is virtually identical in structure to label 15 in the present embodiment.

Although FIG. 9 shows only slot 3 and slot 4 of rail 9, in fact, rail 9 can have as many as 63 slots in the present embodiment. Each slot is associated with a different one of 6-bit patterns 000001 through 111111 corresponding to the respective voltage levels of terminals 933a through 933f. Illustratively, slot 3 is associated with the bit pattern 000011 (which equals 3 in decimal), slot 4 is associated with the bit pattern 00100 (which equals 4 in decimal), and so on and so forth. In accordance with the invention, each slot is allowed to accommodate only one label. Moreover, line 21 is designed in such a way that the 6-bit pattern generated by a label within a particular slot coincides with the bit-pattern associated with that particular slot. Thus, as shown in FIG. 9, when terminals 933a–933f of label 15 come into contact with etched board 43 within slot 3, a bit pattern of 000011 would be generated by label 15, stemming from the present arrangement wherein only terminals 933e and 933f can come in electrical contact with line 21 through metallic contact 97 within slot 3. (It is noteworthy that the size of each of terminals 933a–933f and their interspacing may be different from terminals 33a–33d to implement the present scheme. However, based on the disclosure heretofore, a person skilled in the art should be readily able to select the suitable sizes and interspacing of those terminals for his/her particular applications.) Similarly, when another label 15 having terminals 933a' through 933d' is placed within slot 4, only its terminal 33d' can come into electrical contact with line 21 through metallic contact 99, resulting in generation of the bit pattern of 00100 by the label. It should be pointed out at this juncture that the slots on rail 9 need not be uniform in length and, in fact, their individual lengths may vary with the sizes of goods displayed within the respective slots.

With the arrangement described in FIG. 9, if a label is relocated from its supposed slot to any other slot, computer 11 would recognize such relocation during its periodic polling of the labels. Specifically, in this case computer 11 contains a look-up table listing the label addresses each associated with a different slot number identified by a 6-bit pattern. In addition, the look-up table includes the location information of each slot with respect to a reference point on the rail. In the event that, during a poll, a label reports to computer 11 a 6-bit pattern other than the one which is supposed to be associated with that label, computer 11 will assume that the label has been relocated. Accordingly, computer 11 may, again, issue a warning command to the label, causing its LED to flash so as to alert the store personnel to correct the unwanted relocation. Alternatively, it may generate an exception report identifying the relocated label, and the number and/or location of the slot which it is in based on the received 6-bit pattern.

Figure 10:
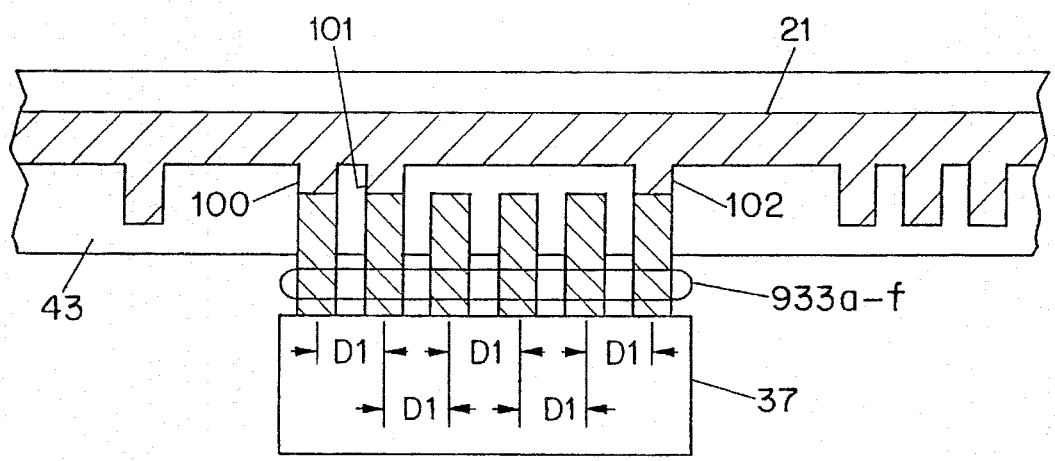
FIG. 10 illustrates a third rail arrangement in accordance with the invention wherein electrical contacts of the bus interface are separated by distances which are integer multiples of a predetermined distance.
Figure 11:
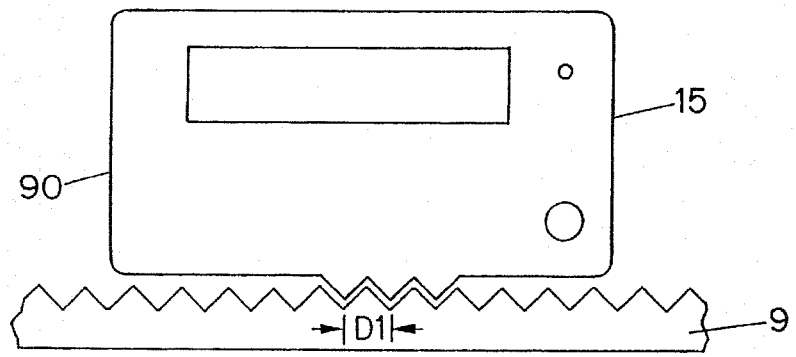
FIG. 11 shows a particular manner in which a label and the rail of the system of FIG. 1 are mechanically engaged with each other in implementing the third rail arrangement of FIG. 10.

A third embodiment involving a different design of line 21 will now be described. In this embodiment, again, only one side of board 43 has thereon a metallic strip of a particular pattern and is conductive, and label 15 has six terminals 933a through 933f extending from connector 37. However, the width the electrical contacts of line 21 is substantially identical to that of terminals 933a–933f of label 15. In addition, these electrical contacts are separated from one another by distances which are integer multiples of D1, which is the distance between two neighboring terminals of label 15. FIG. 10 shows a section of rail 9 which implements this scheme. As shown in FIG. 10, contact 100 and contact 101 is separated by D1, and contact 102 and contact 100 is separated by 5 D1. In accordance with the invention, the labels and the rail is so designed that each label can only move along the rail by multiple increments of D1. This may be achieved by various mechanical means and one such mechanical means is illustrated in FIG. 11. As shown in FIG. 11, case 90 of label 15 is machined to have, on its bottom, angular ridges for engagement with similar machined ridges on the bottom surface of rail 9. In this particular embodiment, the ridges on either case 90 or the rail surface are identical in size, and any two neighboring ridges are separated by D1. Referring back to FIG. 10, line 21 is aligned with terminals 933a–933f of label 15 so that if any terminal comes in touch with an electrical contact on line 21, the terminal and the electrical contact will substantially coincide with each other.

In this particular embodiment, there are 63 distinct positions defined by the combinations of presence and absence of electrical contacts on line 21. Each position assumed by label 15 causes the latter to generate a different one of the 6-bit patterns 000001 though 111111. In other words, each position is associated with a different 6-bit pattern. In this case computer 11 contains a look-up table listing individual label addresses each associated with a different position uniquely identified by a 6-bit pattern. The look-up table also includes information on the locations of these distinct positions with respect to a reference point on the rail. In the event that, during a periodic poll by computer 11, label 15 reports to the computer its address and a 6-bit pattern different from the one that is supposed to be associated with that address, computer 11 will assume that label 15 has been displaced. Accordingly, computer 11 may, once again, issue a warning command to label 15. Alternatively, it may generate an exception report identifying label 15, and its current position based on the received 6-bit pattern.

Figure 12:
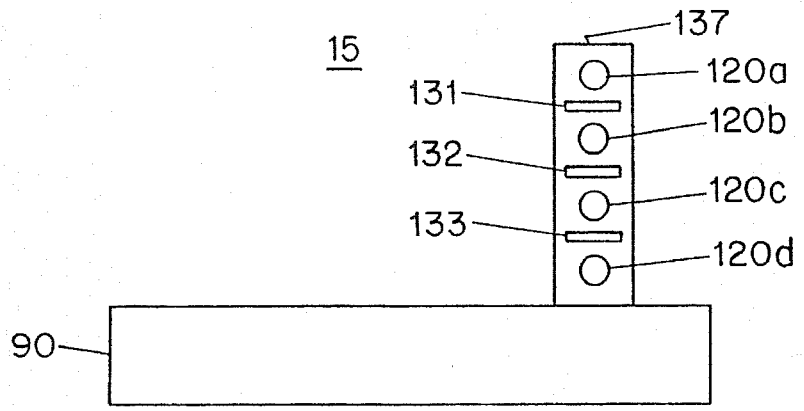
FIG. 12 is a top view of a label used in the fourth embodiment in accordance with the invention.

A fourth embodiment involving different designs of label 15 and rail 9 will now be described. Among others, label 15 in this embodiment has a connector different from connector 37. FIG. 12 illustrates such label 15 having case 90 and connector 137. As shown in FIG. 12, connector 137 includes springy contacts 131, 132 and 133 each similar to contact 31 or 32 as described before. It also includes push buttons 120a, 120b, 120c and 120d which normally protrude from connector 137 and which can be depressed into same. A closer look at FIG. 12 reveals that each springy contact is disposed between two neighboring buttons.

Figure 13:
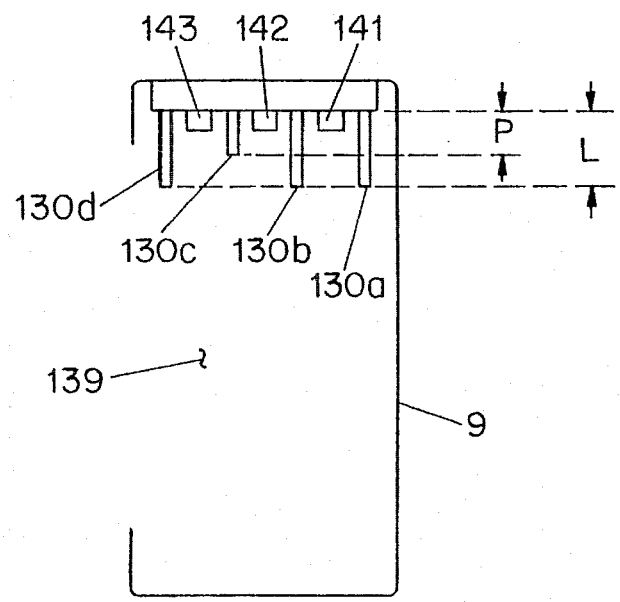
FIG. 13 is a cross-section of a shelf rail used in the fourth embodiment in accordance with the invention.

FIG. 13 illustrates a cross-section of rail 9 used in this particular embodiment. As shown in FIG. 13, conductor 141, conductor 142 and conductor 143 run along the length of rail 9 and are positioned so as to be respectively connected to contacts 131, 132 and 133 when label 15 is snapped onto rail 9. Here, power line 21, data wire 22 and ground wire 23 of FIG. 6 are physically realized as conductors 143, 142 and 141, respectively. With this arrangement, label 15 is grounded through contact 131, capable of conveying messages through contact 132 and powered through contact 133. In accordance with the invention, rail 9 also has four ridges 130a, 130b, 130c and 130d running along its length. These ridges mechanically project from the same surface containing conductors 141, 142 and 143 into space 139 of rail 9. A closer look at FIG. 13 reveals that each conductor is disposed between two neighboring ridges. Ridges 130a, 130b, 130c and 130d are positioned in such a way that they are directly above buttons 120a, 120b, 120c and 120d respectively when label 15 is snapped onto rail 9. In accordance with the invention, in different parts of rail 9, different combinations of the ridges protrude into space 139 in a full-length L, and the remaining ridges protrude in a partial-length P, where P <L. L is so chosen that a ridge assuming a projection of L would depress or activate the respective button when label 15 is snapped onto rail 9 underneath that ridge; and P is so chosen that a ridge assuming a projection of P would clear the height of the respective button and leaving it in a normal, protruding position when label 15 is placed thereunderneath. Thus, if label 15 were snapped onto rail 9 at the particular cross-section as shown in FIG. 13, ridges 130a, 130b and 130d each having a projection L would depress the respective buttons 120a, 120b and 120d while ridge 130c having a projection P would leave the respective button 120c in its normal, protruding position.

Figure 14:
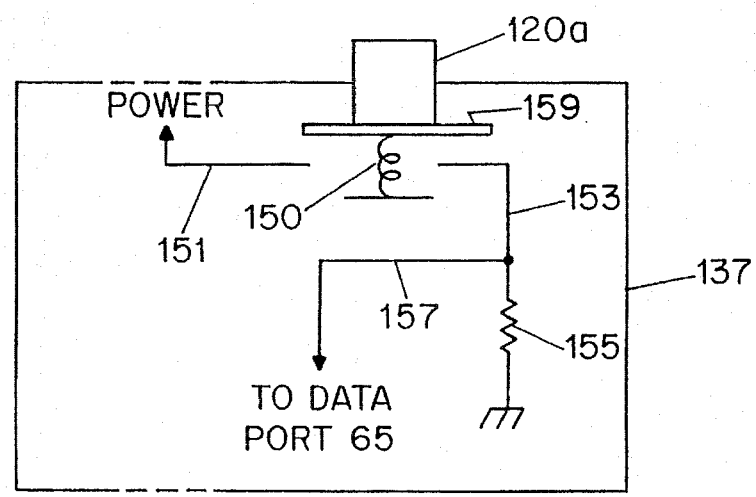
FIG. 14 is a diagram of electrical circuitry underlying a push button on the label of FIG. 12.

The electrical circuitry underlying each push button will now be described. As shown in FIG. 14, button 120a which is loaded with spring 150 pushing button 120a upward in a normal, protruding position. Under the button and within connector 137, wire 151 is connected to the power obtained through contact 133. Resistor 155 of conventional design is connected to wire 153 at one end and to ground at the other end. Wire 157 is connected, at one end, to wire 152 at its connection to resistor 155 and, at the other end, to the input of data port 65 within processor 63 previously described. Conductor 159 is attached to button 130a thereunderneath, and makes electrical contact with wire 151 at one end and wire 153 at the other end when button 130a is depressed. With this arrangement, it can be shown that wire 157 conducts a high voltage level to the input of data port 65 when the button is depressed and a zero voltage level thereto when it is in its normal, protruding position. Other buttons 120b, 120c and 120d are similarly arranged to button 120a, and the description of their respective electrical arrangements is thus omitted here.

As previously described, the resident program within EEPROM 70 causes processor 63 to generate binary bits 1's and 0's in response to the respective high voltage level and low voltage level inputs to data port 65. Thus, if label 15 is snapped onto rail 9 at the particular cross-section as shown in FIG. 13, processor 63 would responsively generate a bit pattern of 1101 corresponding to the depression of buttons 120a, 120b and 120d only.

Figure 15:
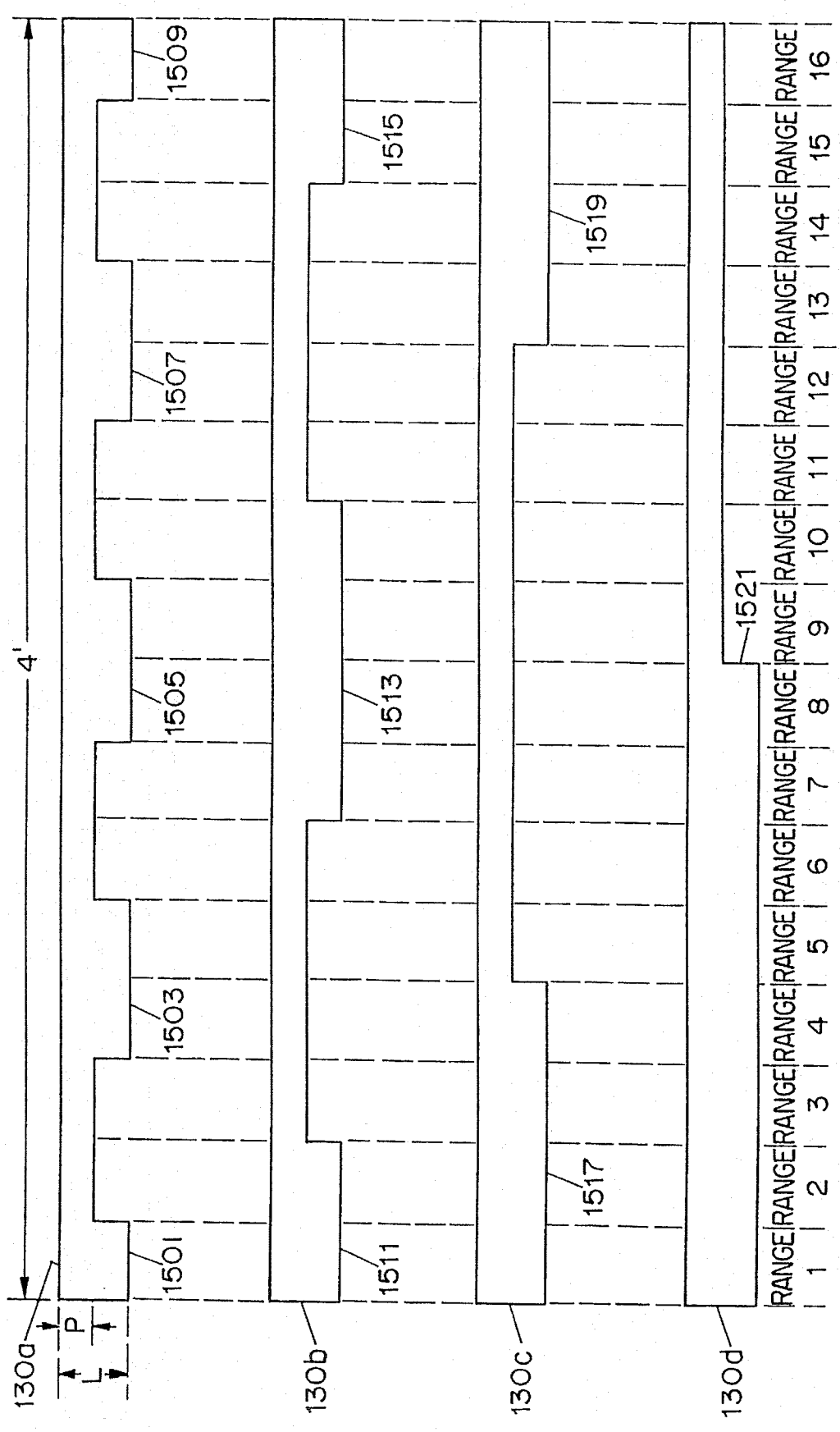
FIG. 15 depicts the shapes of ridges on the shelf rail of FIG. 13 and different ranges along the rail.

FIG. 15 depicts the particular shapes of ridges 130a, 130b, 130c and 130d along rail 9 in this illustrative embodiment.

As shown in FIG. 15, each ridge is four feet long. It is noteworthy that each ridge has different numbers of full-length and partial-length projections and the sizes of such projections are not fixed. For example, within ridge 130a, full-length projection 1501 is three inches long, full-length projection 1503 is six inches long, full-length projection 1505 is six inches long, full-length projection 1507 is six inches long and full-length projection 1509 is three inches long. Within ridge 130b, full-length projection 1511 is six inches long, full-length projection 1513 is one foot long and full-length projection 1515 is six inches long. Within ridge 130c, full-length projection 1517 is one foot long and full-length projection 1519 is also one foot long. Within ridge 130d, full-length projection 1521 is two feet long.

Ridges 130a, 130b, 130c and 130d are designed in such a way that when label 15 of FIG. 12 is snapped onto rail 9 within various ranges or regions of the rail, different bit patterns are caused to be generated by processor 63. To this end, the separation between any two neighboring full-length projections varies from a ridge to another. In fact, such separations vary in such a way that a different bit pattern is guaranteed to engender whenever the label displaces more than a predetermined distance. With the particular shapes of the ridges as in FIG. 15, sixteen ranges are identified along the rail. These ranges are denoted ranges 1 through 16 and they are non-overlappingIn this illustrative embodiment, each individual range is three inches long and associated with a different bit pattern. It can be shown that, here, any displacement of label 15 of FIG. 12 of more than three inches necessarily translates it into a different range corresponding to a different bit pattern.

FIG. 16 tabulates various bit patterns associated with ranges 1 through 16 of FIG. 15. Based on the disclosure heretofore, it should be apparent by now that the cross-section of FIG. 13 is taken from range 8 of the rail corresponding to the bit pattern 1101. Similar to the previous embodiments, computer 11 in this embodiment contains a look-up table listing individual label addresses each associated with a different range uniquely identified by a 4-bit pattern. The look-up table also includes information on the locations of these distinct ranges with respect to a reference point on the rail. As computer 11 periodically polls label 15 for its position, label 15 responsively reports to the computer its address and a 4-bit pattern associated with the range the label is in. In the event that the label reports a 4-bit pattern different from the one that is supposed to be associated with the label address, computer 11 will assume that label 15 has been displaced. Accordingly, computer 11 may, once again, issue a warning command to label 15. Alternatively, it may generate an exception report identifying label 15, and the current range where it is located based on the received 4-bit pattern.

Previous embodiments have portrayed a label determining its position by means of direct electrical contact with coded regions on a rail, or by means of direct mechanical contact with physically coded regions on a rail. An embodiment will now be described in which a label determines its position by means of capacitive sensing.

Turning to FIG. 19 there is shown a front view of a rail including a sensing region 20. The sensing region, as will be seen, is substantially flat and presents a mechanical cross section that is uniform along the length of the rail.

The region, typically made up of a laminated sandwich of insulating and conducting materials, presents a pattern that varies along the length of the rail. As will be described in considerable detail below, a label that is put into place at a position on the rail is then able to sense the pattern and determine its position, which may be communicated back to the store central computer.

In one variant employing wired rails and appenders, the pattern is used simply so that a label may report its position on a particular four-foot section of rail, and the appender information permits the central computer to know which rail the label is on. In such a variant it is assumed that the pattern on each rail is identical to the pattern on each of the other rails. Those skilled in the art will appreciate that on a four-foot rail if the position is to be localized to within one-sixty-fourth of the length of the rail, six bits of data will suffice.

In another variant, the pattern by itself provides a physical location anywhere in the display area (e.g. the entire retail store). Those skilled in the art will appreciate that if there are, say, two thousand rails each four feet in length, then eleven bits will be required simply to specify which rail a label is on, and the above-mentioned six bits to determine which of sixty-four rail sections contains the label. Thus seventeen or more bits would have to be capacitively sensed if such sensing is to determine unambiguously the position of a label in a store.

FIG. 20 is a cross section of a rail in a capacitively-sensed version of the invention. Rail 9 and label 15 are seen, as in previously described figures. The sensing region 20 is shown, and sensing terminal area 200 is on the rear face of the label 15. The physical design of the rail and label is such as to provide a repeatable and precise vertical registration between the sensing region 20 and the terminal area 200. It will be appreciated that if seventeen bits are to be sensed and if the sensing region is, say, 1.5 inches tall in FIG. 20, then the precision and repeatability of vertical alignment between the label, upon repeated removal and replacement, must be quite good, probably better than one-twentieth of an inch.

The sensing region 20 is a printed or silk-screened laminate structure, with a metallized pattern. FIG. 21 is a close-up view of a part of one embodiment of a sensing region 20, defining a binary sequence, not to scale in FIG. 21. Looking ahead to FIGS. 27 and 28 it will be appreciated that since capacitance sensing is essentially a two-terminal measurement, it may be advantageous to include a simple straight-line conductor 302 which serves as a ground reference. If the rail 9 is metal, then it may serve as a ground reference for the capacitance measurement, while if the rail 9 is plastic the reference conductor 302 may be used.

When a counting pattern such as that of FIG. 21 is used, it is necessary to ensure that the sensing terminals of the label 19 are more or less squarely centered on the pattern elements or cells of the pattern. It would not do, for example, to have sensing terminals of a label straddling the boundary between adjacent cells of the pattern of FIG. 21. Those skilled in the art will appreciate that straddling would lead to either or both of the following problems.

First, in the embodiment of FIG. 21, it is assumed that each cell's contents is determined relative to some threshold level of capacitance. Using the visual metaphor of FIG. 21, the label determines if each cell in a particular column is dark or light. But if the sensing terminals straddle a column boundary, then it is possible that two readings in a row would yield different data. A label would appear to have moved when in fact it did not move.

Second, even if sequential readings were to give the same results, the coded information retrieved through the reading might be drawn partly from the column to the left and partly from the column to the right, leading to a set of "on" and "off" states that does not correctly represent either of the two columns. The result would be an incorrect conclusion as to the physical location of the rail, since the column matching the retrieved readings would probably be distant from the label's actual location.

It will be appreciated that in many engineering arts such as reading of bar codes and framing of asynchronous serial data it suffices to have a "start bit" or an equivalent, since the detector is motion either spatially or temporally relative to the data being sensed. When a label is fixed to a rail, however, such an approach is not possible, and other approaches must be devised.

One way to avoid the problem of improperly relying on data from sensing terminals that straddle column boundaries is to use mechanical registration such as is shown in FIG. 11. This has the advantage of permitting the sensing terminal grid of the label to be simple with a minimal number of sensors, but has the disadvantage that the sensing region columns must be precisely aligned relative to the ridges on the rail, and that the sensing terminals must be precisely aligned relative to the ridges on the label.

A second way to avoid the straddling problem is by the use of timing marks and a rectangular grid of sensing terminals such as is shown in FIGS. 22 and 23. FIG. 22 is a plan view of a capacitance sensor of a label. Columns 201, 202, and 203 are provided in a sensing grid with a spacing of D2. Sensing terminals 234 appear at the vertices of the grid. As will be set forth below the number of rows in the grid is selected to be one more than the desired number of data bits. The sensing grid may be a set of springy metallic terminals, a set of rigid terminals held in a resilient matrix, or may be an elastomeric structure with conducting and nonconducting regions.

FIG. 23 shows a portion of a sensing region 20 and its position relative to a sensor such as that of FIG. 22. The top track in FIG. 23 is a timing track, and its metallized areas (dark in FIG. 23) are not as wide as the metallized areas in the other tracks. The spacing between vertical rows defines distance D3.

As will be appreciated, the invention works best if D2 differs from D3, either larger or smaller. D2 may be about two-thirds of D3 or may be one-and-one-half times D3.

FIG. 24 shows the data output for one set of sensors such as those of FIG. 22 when juxtaposed with a sensing region such as that of FIG. 23. The central concept is that of the three columns of the grid of FIG. 22, they cannot all straddle column boundaries in FIG. 23. At least one of the grid columns of FIG. 22 cannot help but be fully registered in cells of the sensing pattern of FIG. 23. The top-row sensors of FIG. 22 are used to determine which sensing column can be trusted, namely, which sensing column happens to have fallen on one of the timing marks of FIG. 23.

One possibility with respect to FIG. 24 is that each sensing terminal of FIG. 22 is connected to electronics that can announce any of three outcomes—a clear "1", a clear "0", or an indeterminate result. If such electronics are present, the ambiguous values at 205 (which, the reader will appreciate, arise due to the straddling at 206 in FIG. 23) would suffice to permit the label to know that it cannot trust the data in the 201 column of the sensing grid. But the timing mark arrangement of FIG. 23 does not require that the electronics of the label correctly identify three results, one of which is intermediate between "0" and "1". Instead, the sensing electronics can be simpler, announcing simply a "1" or "0". For example, in FIG. 24 the timing-mark data of column 201 is a zero, and label software can conclude from this that there is no point in paying attention to the data values in column 201. The software will not be thrown off by the straddling of areas 206 (FIG. 23), due to the "0" in the timing track.

The reader is able to see that of the remaining columns 202, 203 of FIG. 24, the column 203 is in fact best centered. The label software does not, of course, know this. Instead it knows only what the electronics reports for the 202 and 203 columns of the sensing grid. And, as mentioned above, the electronics may be so simple as to yield either a "1" or a "0" for the straddled area 207 (FIG. 23). That is, the intermediate capacitance value shown with a "?" at 204 in FIG. 24 may be reported to software as a "1" or a "0". The case of "0" is easiest to finish. If two of the three sensors 234 in the timing row are "0" and the other sensor of that row is a "1", the software simply concludes that the column to trust is the column containing the "1" in this case the column 203.

The other possibility is that the straddled timing cell of column 202 is measured to be a "1". If this happens, the software could equally well choose to trust the data in either the 202 row or the 203 row. In either row the fact is that the timing mark was a "1" (or close to it) so that the data values can be relied upon as not straddling cells. Either set of derived data values permits the label to report a trustworthy and unambiguous position value.

The example of FIGS. 22, 23, and 24 assumes that seven bits are to be collected, but those skilled in the art will appreciate that more or fewer bits could be collected. The example also omits for clarity the reference electrode which would make reference to a metal rail or to a return line such as line 302 in FIGS. 27 and 28.

Figure 25:
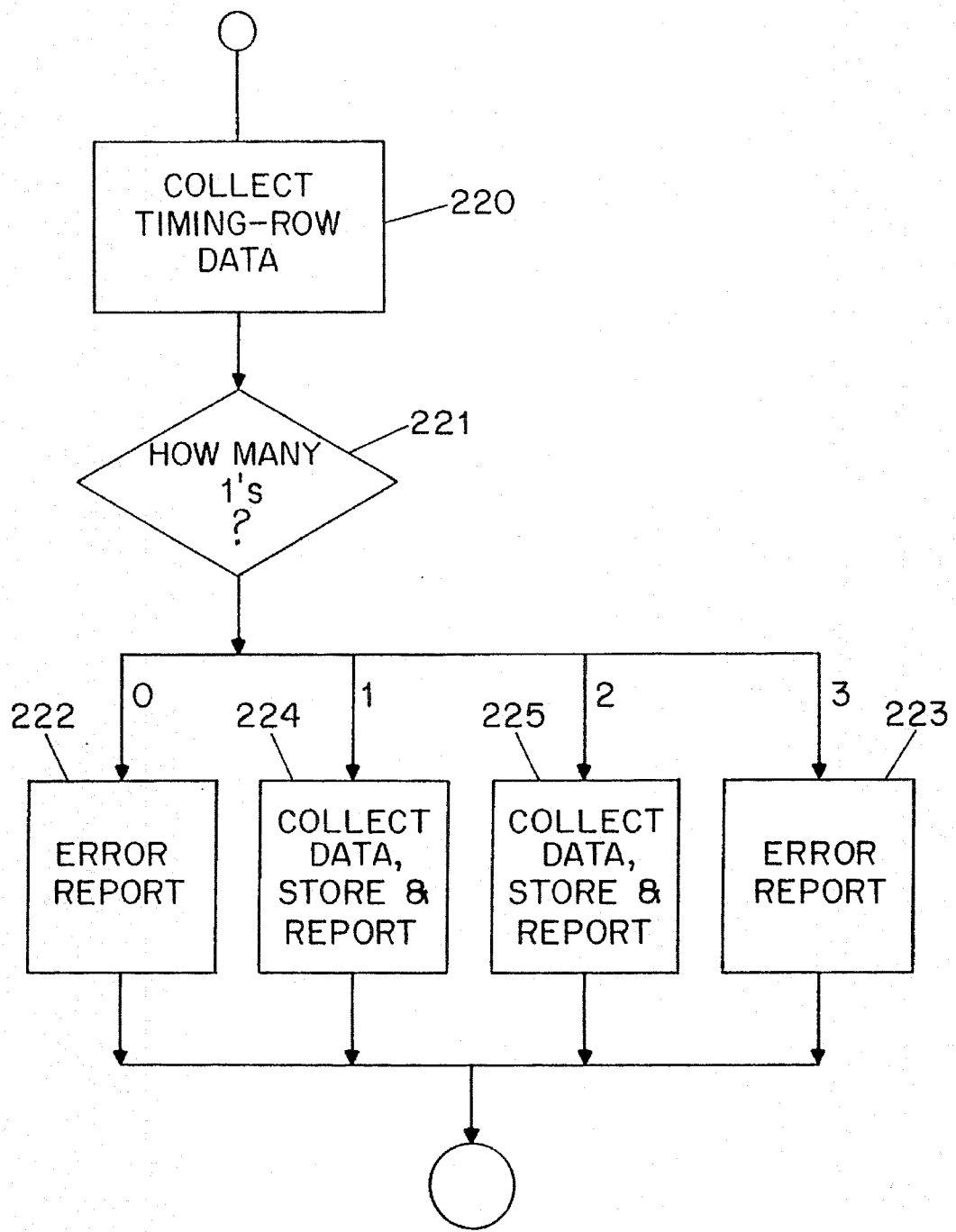
FIG. 25 is a flow chart showing how software in a label or in a store central computer may handle reading in data from a grid such as that of FIG. 22.

FIG. 25 is a flow chart showing how software in a label or in a store central computer may handle reading in data from a grid such as that of FIG. 22. At 220 the software collects the timing-row values. At 221 asks how many "1"'s were sensed in the timing row. The two troubling cases are 0 and 3. These could happen because of problems in the spacing between the label and the rail, because of damage to a rail, because of mechanical failure in the label, or because of improper setting of the threshold level in the capacitance sensor of the label.

At each stage of label design the designer must, of course, balance cost against performance. If the capacitance sensor of the label can have a software-adjusted threshold between "0" and "1", then software can respond to the extreme cases of 0 and 3 with more than just an error report. For example, if no "1"'s are detected (the total is 0) then the threshold may be adjusted downward until at least one "1" is detected. If three "1"'s are detected, the threshold may be adjusted upward until at least one "0" is detected. In this way the label may be self-calibrating with respect to many drift factors that might throw off the capacitive position sensing, such as humidity and temperature changes.

If the above steps take place within a label, the label may report only the position data from one column of the sensing grid. The other approach is to feed the data from all positions of the sensing grid to the store central computer, and for the central computer to perform the above steps.

With the above description in mind those skilled in the art may appreciate that the capacitive-sensed embodiment offers some advantages over the electrically sensed or mechanically sensed rail position. From the manufacturing standpoint one prefers to have as few physical manipulations of the rail as possible. The mechanically sensed rail requires physically complex molding or milling along its length. In the capacitively sensed rail the only thing that changes along the length of the rail is a physically uniform pattern ribbon. The changing pattern on the ribbon does not require physically complex molding or machining, but may only require silk-screening or other imaging of a metallized pattern.

Figure 26:
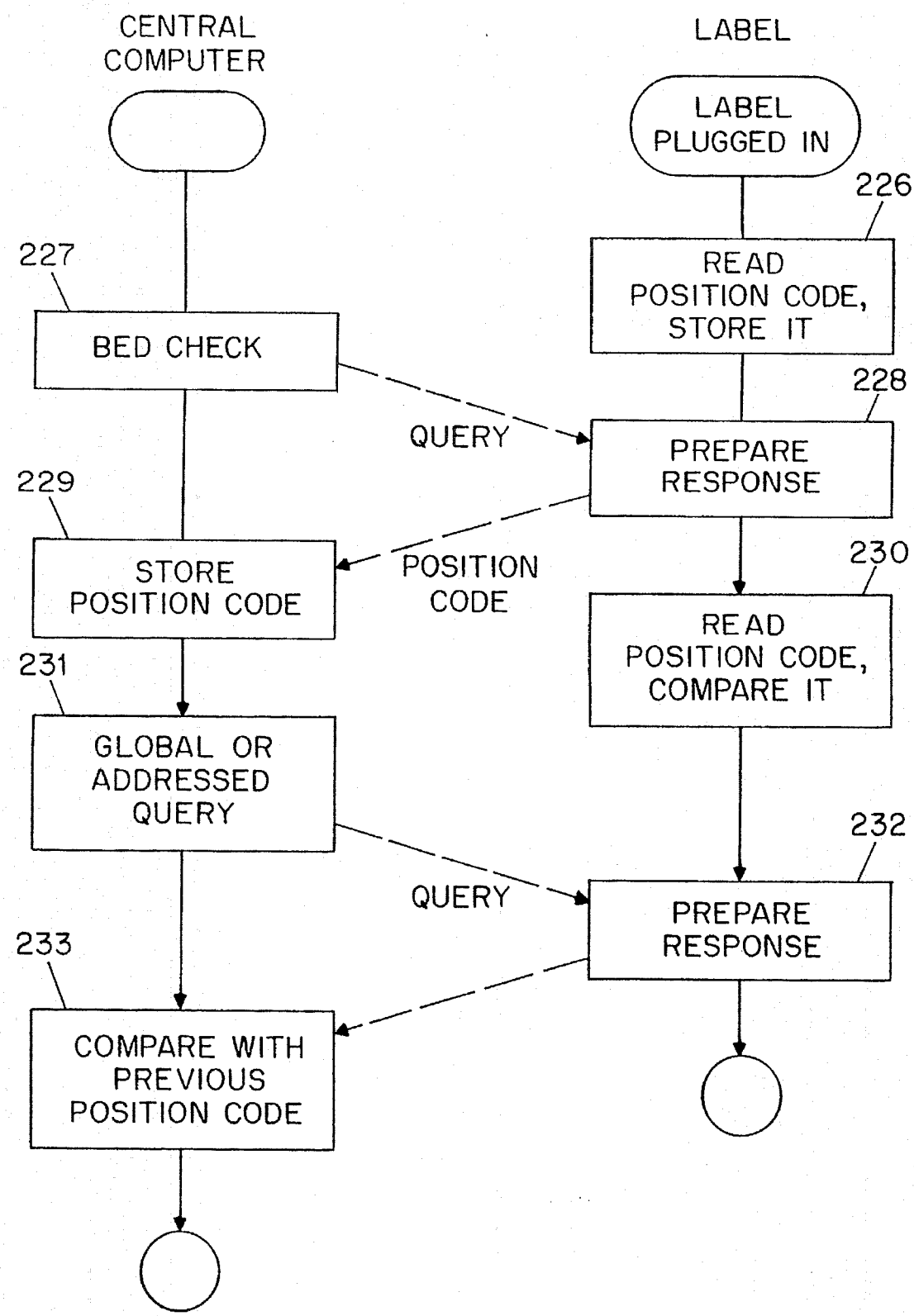
FIG. 26 is a tandem flow chart showing how a label and a store central computer may cooperate in exchanging information about the position of a label.

FIG. 26 is a tandem flow chart showing how a label and a store central computer may cooperate in exchanging information about the position of a label. When a label is plugged into a rail, one of its initial activities is to read and store its location code information at 226. Part of the central computer programming is to perform "bed checks" 227 making sure that it is aware of the status of all labels. The bed check is a query to the label, and the label prepares a response at 228. The response includes the position code data. At 229 the store computer receives and stores the label position information.

From time to time the label may optionally remeasure its position information, and may optionally compare the results with what obtained the previous time the measurement was made, as at 230. If the label is so programmed, the system may then from time to time issue a global inquiry as to whether there exists any label that has found a disagreement between its present and previous position. The response appears at 232 and is received at 233.

Alternatively, the store central computer may simply send out addressed ("polled") queries from time to time to all of its labels as part of the bed check activity. In doing so (as at 231) the system would eventually obtain a response (box 232 and 233). The central computer can then compare the present and previous label locations and can treat a change as an exception requiring further attention.

Those skilled in the art will appreciate that occasionally the present and previous position could differ due to harmless circumstances. For example, it will be recalled that if a timing-mark boundary is straddled, as shown in column 202 of FIG. 23, then in two successive measurements the timing data (column 202 of FIG. 24) might differ. As a result, the position data might one time be taken from column 202 and another time from column 203. Yet since the label has not moved physically the differing position data is not of genuine concern. It is assumed that in software the system would be capable of discerning which changes in position data are insignificant (i.e. those for which the reported positions are physically adjacent) and which are significant (i.e. those for which the reported positions are distant from each other).

Those skilled in the art will appreciate that there is the possibility of confusion in terminology between the position-information data (which might thought of as a "physical address") and the label's logical address in the address space of the communications channel between the label and the central computer. The logical address, also called a bus address, was discussed above in connection with FIG. 1, and preferably each label has a unique bus address. Herein the term "address" will be used to describe the logical or bus addresses mediating communications on the channel, and the position information sensed by the label will be called "location" or "position" data.

Those skilled in the art will also appreciate that the communications channel between the store central computer and the labels could be wired or wireless. Especially in the case of the mechanically sensed or capacitively sensed location data, the communications channel could be wireless (e.g. RF or infrared) without deviating in any way from the invention.

As was mentioned above, if appenders are used to permit the system to know which rail a particular label is on, then it may suffice to employ the invention simply to narrow down the position of the particular label on its (known) rail. Indeed of the several labels on a particular rail it may suffice to know merely the relative positions of the labels with respect to each other. If so, the sensing region 20 may be simpler, as shown in FIGS. 27 and 28.

Figure 27:
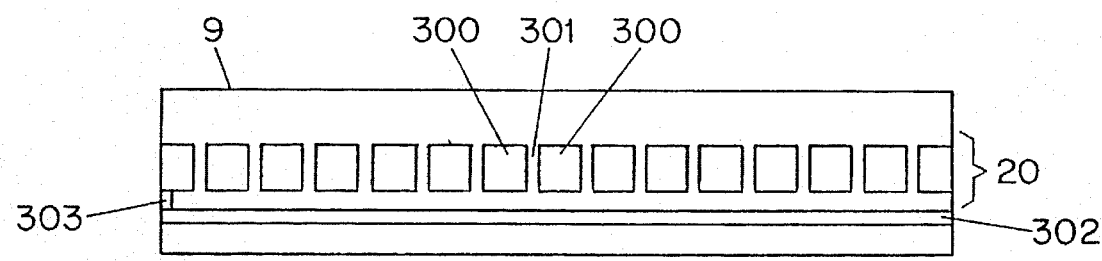
FIG. 27 is a plan view of a sensing region 20 formed of a capacitor chain.

FIG. 27 is a plan view of a sensing region 20 formed of a capacitor chain. A series of conducting blocks 300 are closely spaced at gaps 301, each of which defines a capacitor. Return line 302 is bonded to the chain at one end with conductor 303. Each of the labels affixed to the rail is asked what capacitance it measures between the chain and the return line, and the responses are sorted to derive the physical sequence of labels. This sequence may be stored by the store central computer. Whenever a new label is put into place on a particular label, the labels on the rail are again polled and the measured capacitance values used to derive the label sequence.

Figure 28:
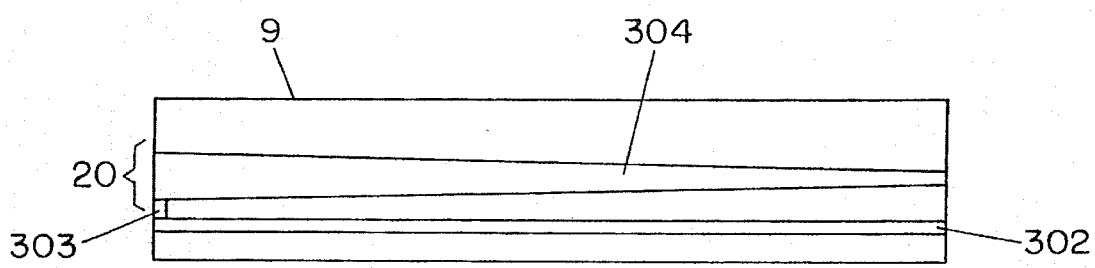
FIG. 28 is a plan view of a sensing region 20 formed in a taper.

FIG. 28 is a plan view of a sensing region 20 formed in a taper. A wide sensing terminal is used in the label (such as that shown in FIG. 30) to form a capacitor the value of which varies with position on the rail. All labels on the rail are polled as with FIG. 27.

Figure 31:
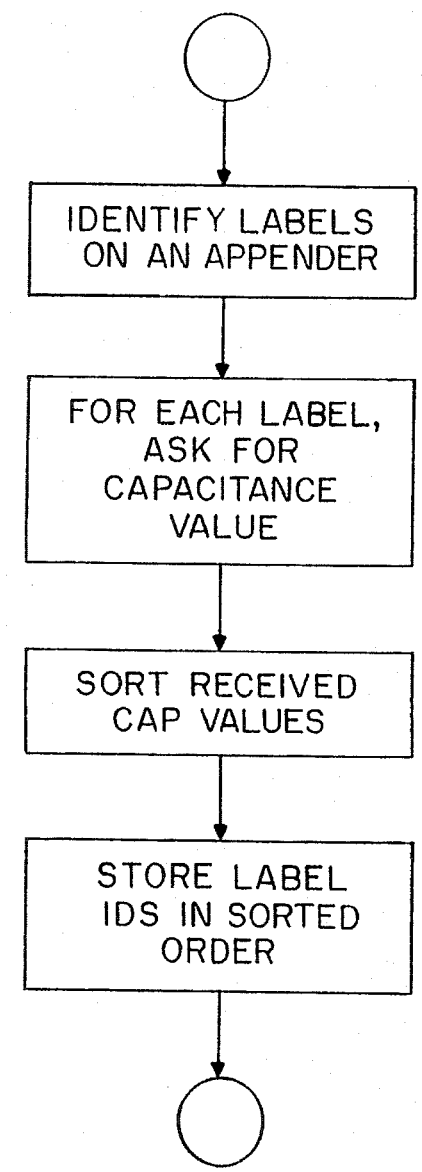
FIG. 31 is a flow chart showing how a store central computer may obtain relative position information using a tapered capacitance sensing region.

FIG. 31 shows in flow chart form the procedure carried out by the store central computer with the sensing regions of FIG. 27 or FIG. 28.

The internal workings of the capacitance sensors of the labels will now be described. Those skilled in the art will appreciate that in many real-life analog-to-digital design tasks there is pressure to make the A-to-D conversion quickly. If a multiplexer is used to share an A-to-D convertor between many sensing locations there my be concern about significant events occurring at a particular location at a time when the multiplexer is not selecting that location. In the present situation, however, these concerns are less pressing. The capacitive sensing circuitry can take its time since nothing is changing quickly external to the label. The label is in place on the rail for very long times, typically days or months, permitting plenty of time for measurements.

Since a store contains typically tens of thousands of labels, rather more importance is placed on minimizing the cost of the individual labels.

Figure 29:
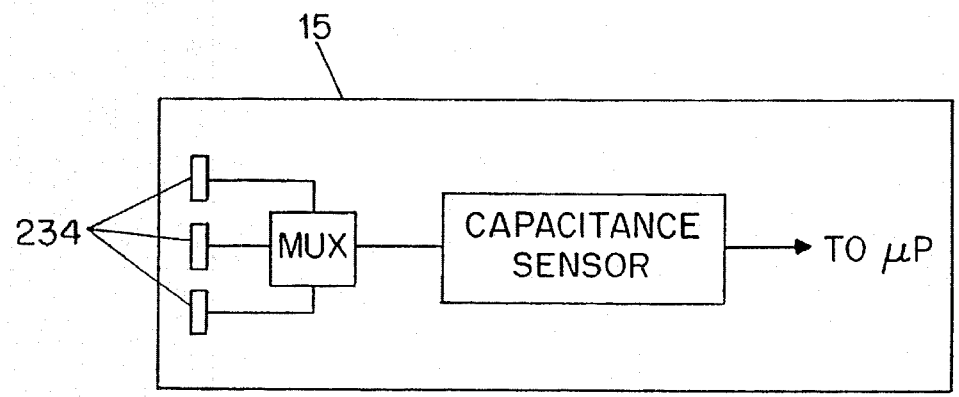
FIG. 29 is a functional block diagram of a label 15 with a capacitance sensor and multiplexer.

FIG. 29 is a functional block diagram of a label 15 with a capacitance sensor and multiplexer. Sensing terminals 234 are shown with a multiplexer selectively connecting one or another of the terminals to the capacitance measurement circuitry. This configuration may be used in the multi-terminal embodiments of the system, such as the terminal grid embodiment of FIG. 22 or the embodiment using a single column of sensors with mechanical registration such as is shown in FIG. 11.

Figure 30:
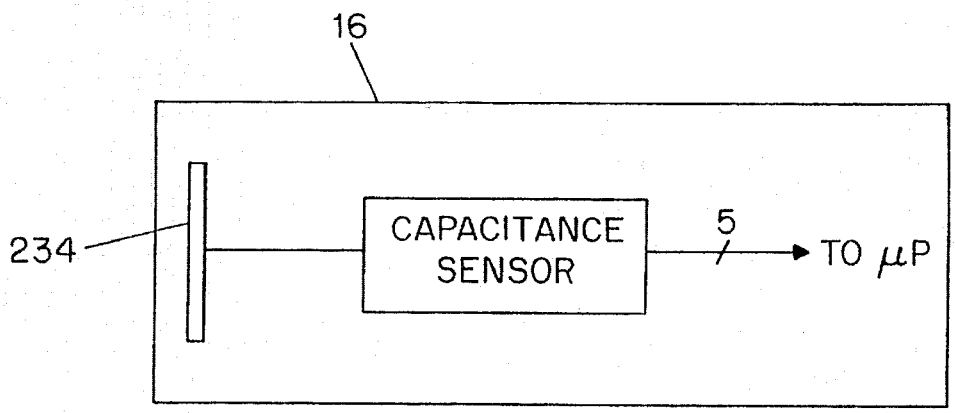
FIG. 30 is a functional block diagram of a label 15 with a sensor of a type to be used with a tapered sensing region such as that of FIG. 28.

FIG. 30 is a functional block diagram of a label 15 with a sensor of a type to be used with a tapered sensing region such as that of FIG. 28. A single wide terminal 234 is sized and positioned to come nearby to the tapered region 304. The sensing circuitry gives a multi-bit signal (preferably at least five bits as shown) to the processor of the label. This type of label could also be used with the capacitor-chain sensing region of FIG. 27.

Figure 30A:
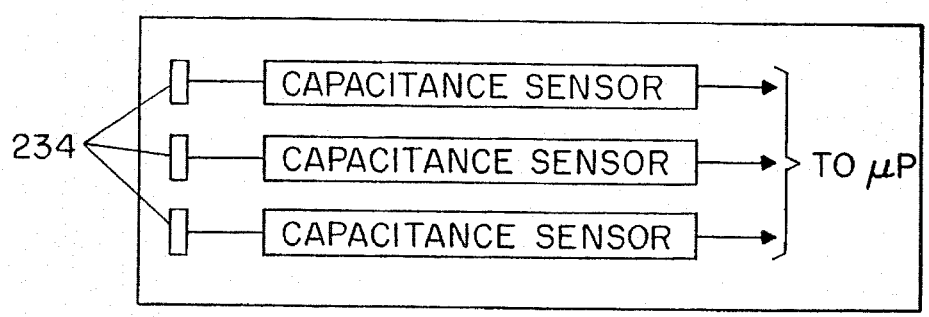
FIG. 30A is a functional block diagram of a label 15 with a plurality of sensing terminals and sensing circuits.

FIG. 30a is a functional block diagram of a label 15 with a plurality of sensing terminals and sensing circuits. This case is chosen if the multiplexer of FIG. 29 proves to be unsuitable due to cost or other reasons.

As mentioned above in a typical retail store there will typically be several thousand feet of rail. If a sensing pattern is chosen that does not repeat for several thousand feet, then the sensing pattern will permit the location of a label to be uniquely determined. The labels in a store vary in width but most are at least three inches wide, so the pattern may be selected so that it changes every three inches. During manufacture the rails are preferably extruded from a suitable material (aluminum or plastic) and the sensing region is pressed into place and held to the rail by an adhesive. The sensing region material, preferably plastic, is cut to length to match the rails.

When the rails are delivered to the store to be installed to the shelves of the store, it may be thought that it would be necessary to mark the rails with sequential markings so that they are installed to the shelves in a particular sequence, but such is not the case. Instead, the rails may be affixed to the shelves in random order, and it does not matter if individual rails are damaged or misplaced. When the physical rail installation is finished the installation personnel undertake a simple one-time calibration procedure as will now be set forth.

After the physical rail installation is finished the rails are numbered according to some simple scheme. The numbering plan can consist of the aisle number, the side of the aisle, the distance along the aisle, and the shelf number. Then a database is built up within the store central computer, defined by the location code information for (say) the left end of each four-foot rail section. Following a prearranged sequence, display labels are snapped into place at the left end of each rail. Each label reports its position to the central computer, and in this way the database is built up. This calibration process, though time-consuming, need only be done once and need not be done again unless shelves are moved within the store.

Later, when a new label is snapped into place, the location code is compared with the left-end-of-rail origins built up in the calibration process. In this way the store central computer determines the rail to which the label has been affixed and the position relative to the left end of the rail.

The foregoing merely illustrates the principles of the invention and those skilled in the art will be able to devise numerous arrangements which, although not explicitly shown or described herein, embody the principles of the invention.

For example, it is appreciated that those skilled in the art may combine different techniques as set forth above to suit their particular applications. For instance, the arrangement in the third embodiment described in FIG. 10 may be implemented in conjunction with the partitioning technique as disclosed in the second embodiment where rail 9 is mechanically divided into a plurality of slots and only one label can be placed in each slot.

Moreover, although in each illustrative embodiment label 15 conveniently obtains its power from power line 21 through one or more of its terminals 33a–33d or 933a–933f, the latter need not be so required to perform the dual function of relaying the power as well as locating the label. Rather, label 15 may obtain its power from another means which does not involve any of terminals 33a–33d or 933a–933f. In that case, since the terminals are solely used for label locating purposes, the requirement that at least one of those terminals be in electrical contact with line 21 will no longer be necessary. Thus, without affecting its power supply, label 15 may be programmed to generate the bit pattern of all zeros corresponding to the position or zone on rail 9 where none of terminals 33a–33d or 933a–933f makes electrical contact with line 21. Furthermore, having removed the power relaying function from terminals 33a–33d or 933a–933f, those skilled in the art may freely devise other arrangements having those terminals electrically connected to other wires than line 21. For instance, ground wire 31 may be realized on a printed circuit board which is etched to obtain patterns similar to those of line 21 as described hereinbefore. A selected number of terminals 33a 33d or 933a–933f make electrical contact with ground wire 31, as opposed to any power line, to realize distinct positions as the terminals move along rail 9. In that instance, label 15 may be programmed to generate a binary bit 0 when a terminal makes electrical contact with the ground wire and otherwise a binary bit 1. This being so, label 15 may also generate the bit pattern all zeros corresponding to the position or zone on rail 9 where all of terminals 33a–33d or 933a–933f make electrical contact with ground wire 31.

In addition, ridges 130a through 130d in the fourth embodiment need not be disposed on the top surface of rail 9 as in FIG. 13. For example, they may be disposed on the back of rail 9 as in FIG. 17 which illustrates a cross-section thereof. Accordingly, case 90 and push buttons 120a through 120d of the label need to be rearranged as in FIG. 18 which illustrates the side view of modified label 15. With this rearrangement, the buttons of FIG. 18 can again be engaged with the ridges of FIG. 17 in accordance with the invention.

Figure 32:
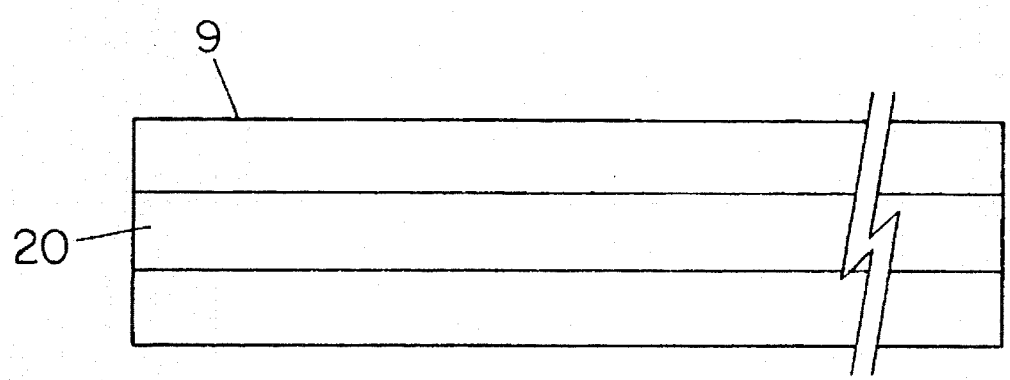
FIG. 32 is a front view of a rail with an optical sensing region.

The invention has thus far been described with respect to embodiments that use electrical contacts, mechanical patterns, and capacitive sensors as means by which a label according to the invention may obtain information indicative of its position along a display rail. In a fourth embodiment a display label and rail arrangement are employed in which position information is made available optically. The rail 9, shown in FIG. 32, bears a sensing region 20 much like that in the capacitive sensing embodiment. The sensing region 20 has a pattern of areas that are selectively reflective and nonreflective. It should be appreciated that in this context "reflective" and "nonreflective" are defined with respect to the wavelength of light at which the light sensors are sensitive. For visible light sensors the areas will be "light" and "dark" as the terms are normally used for human vision. Where the sensors are infrared sensors, it may happen that the regions being sensed are quite different in their reflection of infrared light, and yet may appear to be nearly the same in color by the eye. The sensing region is illuminated by light containing energy at the wavelength of interest, the sensing region selectively reflects and absorbs light at that wavelength, and the sensors sense light of that wavelength.

It will also be appreciated that while the preferred embodiment with optical sensing assumes the sensing mechanism to be reflection of light, a fluorescent marker could be used instead. In this arrangement the light source emits light of the stimulating wavelength for the marker, and the sensors detect the wavelength emitted by the fluorescent marker when stimulated. Generally this embodiment of the invention may be thought of as relying upon varying responsiveness to light, whether by reflection or fluorescence, or otherwise.

The possibility of selecting a reflective or fluorescent marker for the sensing area that is not particularly noticeable to the eye is of interest because in a retail store the aesthetic appearance of the rail 9 is important. The portions of the rail 9 that are not obscured by labels are visible to store patrons, for example, and this includes much of the sensing area 20.

Figure 33:
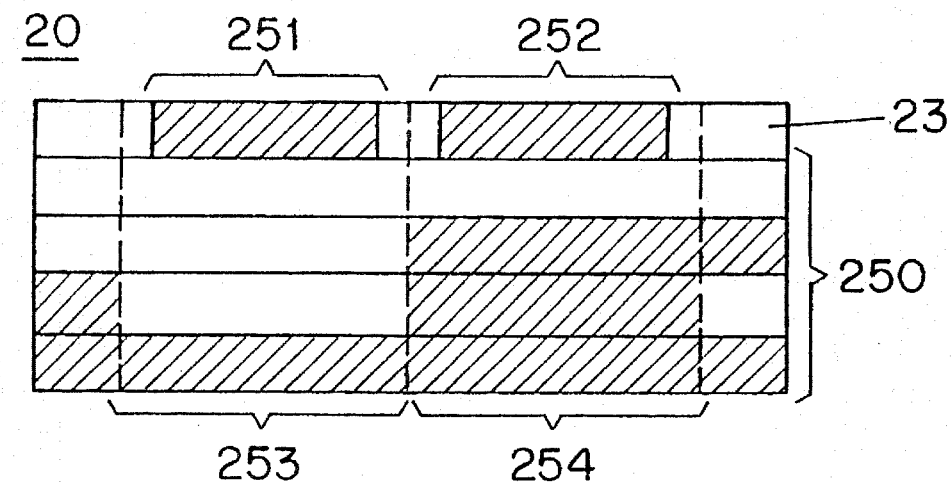
FIG. 33 is a plan view of a portion of an optical sensing region 20.

Turning now to FIG. 33, what is shown is a portion of the sensing region 20. Data areas 253, 254 are shown which will yield differing position data to labels positioned thereupon. The position data are derived from the patterns in rows 250. Much as with the capacitive sensing embodiment a timing track 23 is optionally provided, with timing areas 251, 252 shown that correspond to data areas 253, 254.

Figure 34:
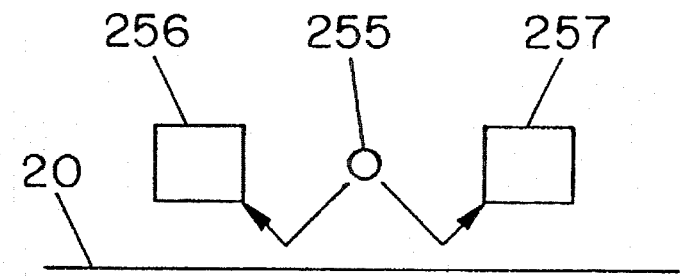
FIG. 34 is a cross section of a portion of an optical sensor array for use with an optical sensing region 20 such as is shown in FIG. 33.

In FIG. 34 is shown a cross section of one embodiment of a light sensor of a type usable in a label when juxtaposed with a sensing region 20. The cross section of FIG. 34 protrays the manner in which one of the rows 250 (FIG. 33) or row 23 (FIG. 33) may be sensed. A single light source 255 preferably provides light to be reflected (or fluoresced) by particular portions of sensing area 20. The spacing between the sensors 256, 257 and the dimensions of the timing marks of two 23 are selected so that the label may protect itself from the occasionally inevitable situation where one of the sensor columns (several sensors positioned like sensor 256 or 257) may straddle two columns such as 253, 254 (FIG. 33). If both timing mark sensors for row 23 sense light (i.e. each sensor is well within the timing mark) then either column of data may be trusted. If neither timing sensor senses light then there may be a failure such as a mechanical misposition of a label. If one of the timing sensors senses light then of course the data sensors associated with the timing sensor that sensed the light should be used.

Although the preferred embodiment uses fewer light sources than sensors (here, by a factor of 1 to 2) one could of course have as many light sources as there are sensors. It would also be possible to design a label in which the sensing region is illuminated by ambient room light, channeled through an appropriate light guide. This arrangement reduces the energy budget for the label.

It will also be appreciated that the light sources 255 need not be on all the time, but only need to be lit when position sensing is taking place. This also reduces the energy budget for the label.

Those skilled in the art will have no difficulty devising obvious variations on the embodiments set forth herein, by which a display label may obtain information about its position, without deviating in any way from the invention, the scope of which is defined by the claims.

Finally, the invention is disclosed herein in a form in which the various functions of system 10 are performed by discrete functional blocks. However, any one or more of these functions could equally well be performed by one or more appropriately programmed microprocessors, microcoded integrated circuits, application-specific integrated circuits, and so on.

We claim:

1. Apparatus for detecting location of a display device having means for generating different signals, said apparatus comprising:
   a rail comprising:
      mechanical means for mounting said device on said rail;
      interface means for causing the generating means of said device to generate a signal indicative of a region within said rail where said device is mounted, the interface means causing the generating means to generate a different signal than said signal when said device displaces by more than a predetermined distance along said rail; and
      means for transporting a signal generated by the generating means.

2. The apparatus of claim 1 wherein the generating means includes a plurality of switch means each operable for conducting an electrical voltage.

3. The apparatus of claim 2 wherein said interface means includes a plurality of mechanical means for activating selected ones of said switch means when said device is mounted on said rail.

4. The apparatus of claim 3 wherein said mechanical means includes a plurality of ridges each extending from said rail in a selected one of a first length and a second length, the first length being longer than the second length.

5. The apparatus of claim 4 wherein each ridge is associated with a different switch means, and wherein a ridge extending from said rail in said first length activates the switch means associated therewith.

6. The apparatus of claim 3 wherein the generating means includes means for detecting any activated switch means.

7. The apparatus of claim 3 wherein the generating means generates an individual signal indicative of any activated switch means.

8. The apparatus of claim 7 wherein said individual signal comprises an ensemble of digital bits, each bit being associated with a different switch means.

9. The apparatus of claim 8 wherein said ensemble forms a bit pattern wherein a value of a bit is indicative of whether the switch means associated with said bit is activated.

10. The apparatus of claim 1 wherein each of said different signals comprises an ensemble of digital bits forming a different bit pattern, and wherein said rail is partitioned into a plurality of regions, each region being associated with said different bit pattern.

11. The apparatus of claim 10 wherein said plurality of regions are identical in length.

12. The apparatus of claim 1 wherein said rail includes means for providing electrical power.

13. The apparatus of claim 1 wherein said rail includes means for providing an electrical ground.

14. The apparatus of claim 1 wherein said device includes a plurality of terminals, and wherein said interface means includes a plurality of electrical contacts for electrically connecting a combination of said terminals to said interface means, said electrical contacts being unevenly spaced so that said combination of said terminals changes when said device displaces by more than said predetermined distance.

15. The apparatus of claim 14 wherein said interface means includes means for providing an electrical voltage and said combination of said terminals are electrically connected to the providing means.

16. The apparatus of claim 14 wherein said interface means includes means for providing an electrical ground and said combination of said terminals are electrically connected to the providing means.

17. The apparatus of claim 14 wherein said rail further comprises mechanical means for partitioning said rail into a plurality of regions, said device being mounted within a particular region, said combination of said terminals being different from another combination of said terminals electrically connected to said interface means when said device is mounted within a region other than said particular region.

18. The apparatus of claim 17 wherein said plurality of regions are identical in length.

19. The apparatus of claim 14 wherein said terminals are evenly spaced, any two neighboring terminals on said device being separated by a first distance, and individual pairs of neighboring electrical contacts on said interface means being separated by distances which are integer multiples of said first distance.

20. The apparatus of claim 19 wherein said mechanical means includes means for mechanically engaging said device with said rail in such a manner that said device can only displace on said rail by distances which are integer multiples of said first distance.

21. The apparatus of claim 19 wherein said rail further comprises mechanical means for partitioning said rail into a plurality of regions, said price display device being mounted within a particular region, said combination of said terminals being different from another combination of said terminals electrically connected to said interface means when said device is mounted within a region other than said particular region.

22. The apparatus of claim 21 wherein said plurality of regions are identical in length.

23. The apparatus of claim 14 wherein each terminal includes means for mechanically clasping onto said interface means.

24. The apparatus of claim 1 wherein the generating means includes a plurality of capacitance sensors, the signals being depending on sensed capacitances.

25. The apparatus of claim 1 wherein the generating means includes a plurality of optical sensors, the signals being depending on sensed light levels.

26. A display device for use with a rail having interface means comprising:
mechanical means for mounting said device on said rail; and means for generating different signals, the interface means of said rail causing the generating means to generate a signal indicative of a region of said rail where said device is mounted and causing the generating means to generate a different signal than said signal when said device displaces by more than a predetermined distance along said rail.

27. The device of claim 26 wherein the generating means includes a plurality of switch means each operable for conducting an electrical voltage.

28. The device of claim 27 wherein the generating means includes means for detecting any activated switch means.

29. The device of claim 27 wherein the generating means generates an individual signal indicative of any activated switch means.

30. The device of claim 29 wherein said individual signal comprises an ensemble of digital bits, each bit being associated with a different switch means.

31. The device of claim 30 wherein said ensemble forms a bit pattern wherein a value of a bit is indicative of whether the switch means associated with said bit is activated.

32. The device of claim 26 wherein said interface means includes a plurality of unevenly spaced electrical contacts, said device further comprising a plurality of terminals, a combination of said terminals electrically connecting said device to one or more of said electrical contacts of said interface means, and wherein said signal is also indicative of said combination of terminals electrically connected to said interface means.

33. The device of claim 32 wherein said interface means includes means for providing an electrical voltage and said combination of terminals are electrically connected to the providing means.

34. The device of claim 32 wherein said interface means includes means for providing an electrical ground and said combination of terminals are electrically connected to the providing means.

35. The device of claim 32 wherein said terminals are evenly spaced.

36. The device of claim 32 wherein any two neighboring terminals are separated by a predetermined distance and said mechanical means includes means for mechanically engaging said device with said rail in such a manner that said device can only displace on said rail by distances which are integer multiples of said predetermined distance.

37. The device of claim 32 wherein each terminal includes means for mechanically clasping onto said interface means.

38. The apparatus of claim 26 wherein the generating means includes a plurality of capacitance sensors, the signals being depending on sensed capacitances.

39. The apparatus of claim 26 wherein the generating means includes a plurality of optical sensors, the signals being depending on sensed light levels.

40. An arrangement comprising:
at least one display device, each display device comprising: means for generating different signals; and a rail comprising:
mechanical means for mounting said device on said rail;
interface means for causing the generating means of said device to generate a signal indicative of a region within said rail where said device is mounted; the interface means causing the generating means to generate a different signal than said signal when said device displaces by more than a predetermined distance along said rail.

41. The arrangement of claim 40 wherein the generating means includes a plurality of switch means each operable for conducting an electrical voltage.

42. The arrangement of claim 41 wherein said interface means includes a plurality of mechanical means for activating selected ones of said switch means when said device is mounted on said rail.

43. The arrangement of claim 42 wherein said mechanical means includes a plurality of ridges each extending from said rail in a selected one of a first length and a second length, the first length being longer than the second length.

44. The arrangement of claim 43 wherein each ridge is associated with a different switch means, and wherein a ridge extending from said rail in said first length activates the switch means associated therewith.

45. The arrangement of claim 42 wherein the generating means includes means for detecting any activated switch means.

46. The arrangement of claim 42 wherein the generating means generates an individual signal indicative of any activated switch means.

47. The arrangement of claim 46 wherein said individual signal comprises an ensemble of digital bits, each bit being associated with a different switch means.

48. The arrangement of claim 47 wherein said ensemble forms a bit pattern wherein a value of a bit is indicative of whether the switch means associated with said bit is activated.

49. The arrangement of claim 40 wherein each of said different signals comprises an ensemble of digital bits forming a different bit pattern, and wherein said rail is partitioned into a plurality of regions, each region being associated with said different bit pattern.

50. The arrangement of claim 49 wherein said plurality of regions are identical in length.

51. The arrangement of claim 40 wherein said rail includes means for providing electrical power.

52. The arrangement of claim 40 wherein said rail includes means for providing an electrical ground.

53. The arrangement of claim 40 wherein said device includes a plurality of terminals, and wherein said interface means includes a plurality of electrical contacts for electrically connecting a combination of said terminals to said interface means, said electrical contacts being unevenly spaced so that said combination of said terminals changes when said device displaces by more than said predetermined distance.

54. The arrangement of claim 53 wherein said interface means includes means for providing an electrical voltage and said combination of said terminals are electrically connected to the providing means.

55. The arrangement of claim 53 wherein said interface means includes means for providing an electrical ground and said combination of said terminals are electrically connected to the providing means.

56. The arrangement of claim 40 wherein said rail further comprises mechanical means for partitioning said rail into a plurality of regions, said device being mounted within a particular region, said combination of said terminals being different from another combination of said terminals electrically connected to said interface means when said device is mounted within a region other than said particular region.

57. The arrangement of claim 56 wherein said plurality of regions are identical in length.

58. The arrangement of claim 53 wherein said terminals are evenly spaced, any two neighboring terminals on said device being separated by a first distance, and individual pairs of neighboring electrical contacts on said interface means being separated by distances which are integer multiples of said first distance.

59. The arrangement of claim 58 wherein said mechanical means includes means for mechanically engaging said device with said rail in such a manner that said device can only displace on said rail by distances which are integer multiples of said first distance.

60. The arrangement of claim 58 wherein said rail further comprises mechanical means for partitioning said rail into a plurality of regions, said price display device being mounted within a particular region, said combination of said terminals being different from another combination of said terminals electrically connected to said interface means when said device is mounted within a region other than said particular region.

61. The arrangement of claim 60 wherein said plurality of regions are identical in length.

62. The arrangement of claim 53 wherein each terminal includes means for mechanically clasping onto said interface means.

63. The arrangement of claim 40 wherein the generating means includes a plurality of capacitance sensors, the signals being depending on sensed capacitances.

64. The arrangement of claim 40 wherein the generating means includes a plurality of optical sensors, the signals being depending on sensed light levels.

65. A display device comprising:

means for mounting said device on a rail having an interface;

a plurality of terminals, a combination of said terminals electrically connecting said device to said interface;

means for receiving a request for identification of location of said device on said rail; and means responsive to said request for sending a signal indicative of said combination of said terminals electrically connected to said interface.

66. The device of claim 65 wherein said interface includes means for providing an electrical voltage and said combination of said terminals are electrically connected to the providing means.

67. The device of claim 65 wherein said interface includes means for providing an electrical ground and said combination of said terminals are electrically connected to the providing means.

68. A system comprising:

a rail having an interface;

one or more display devices which are mounted on said rail, each device being associated with a different address and including a plurality of terminals;

means for sending a request indicating an address associated with a particular device, a combination of the terminals of said particular device electrically connecting said particular device to said interface of said rail;

means for receiving a message indicative of said combination of said terminals, said message having been sent by said particular device in response to said request; and means for deriving from said message a position of said particular device on said rail.

69. The system of claim 68 wherein said interface includes means for providing an electrical voltage and said combination of said terminals are electrically connected to the providing means.

70. The system of claim 68 wherein said interface includes means for providing an electrical ground and said combination of said terminals are electrically connected to the providing means.

71. The system of claim 68 wherein said rail further comprises mechanical means for partitioning said rail into a plurality of slots, said particular device being mounted within a particular slot, said combination of said terminals being different from another combination of said terminals electrically connected to said interface when said particular device is mounted within a slot other than said particular slot.

72. The system of claim 68 wherein said plurality of slots are identical in length.

73. The system of claim 68 wherein said terminals are evenly spaced, any two neighboring terminals on said device being separated by a first distance, said rail includes means for mechanically engaging said device with said rail in such a manner that said device can only displace on said rail by distances which are integer multiples of said first distance.

74. The system of claim 68 wherein each terminal includes means for mechanically clasping onto said interface.

75. A method for locating a display device on a rail having interface means, said device having means for generating different signals, said method comprising the steps of:

mounting said device on said rail;

causing by said interface means the generating means of said device to generate a signal indicative of a region within said rail where said device is mounted, and causing by said interface means the generating means to generate a different signal than said signal when said device displaces by more than a predetermined distance along said rail; and transporting a signal generated by the generating means.

76. The method of claim 75 wherein said device comprises a plurality of switch means, wherein said signal is indicative of any activated switch means.

77. The method of claim 76 wherein said signal comprises an ensemble of digital bits, each bit being associated with a different switch means.

78. The method of claim 75 wherein said ensemble forms a bit pattern wherein a value of a bit is indicative of whether the switch means associated with said bit is activated.

79. The method of claim 75 wherein each of said different signals comprises an ensemble of digital bits forming a different bit pattern, said method further comprising the step of partitioning said rail into a plurality of regions, each region being associated with said different bit pattern.

80. The method of claim 79 wherein said plurality of regions are identical in length.

81. The method of claim 75 wherein the generating means includes a plurality of capacitance sensors, the signals being depending on sensed capacitances.

82. The method of claim 75 wherein the generating means includes a plurality of optical sensors, the signals being depending on sensed light levels.

83. A method for use with a display device having means for generating different signals, comprising the steps of:

mounting said device on a rail having interface means;

generating different signals by the generating means; and causing by said interface means the generating means to generate a signal indicative of a region of said rail where said device is mounted and causing by said interface means the generating means to generate a different signal than said signal when said device displaces by more than a predetermined distance along said rail.

84. The method of claim 84 wherein said device comprises a plurality of switch means, said method further comprising the step of detecting any switch means activated by said interface means.

85. The method of claim 84 wherein said device comprises a plurality of switch means, and wherein said signal indicative of any switch means activated by said interface means.

86. The method of claim 85 wherein said signal comprises an ensemble of digital bits, each bit being associated with a different switch means.

87. The method of claim 86 wherein said ensemble forms a bit pattern wherein a value of a bit is indicative of whether the switch means associated with said bit is activated.

88. The method of claim 83 wherein the generating means includes a plurality of capacitance sensors, the signals being depending on sensed capacitances.

89. The method of claim 83 wherein the generating means includes a plurality of optical sensors, the signals being depending on sensed light levels.

90. A method for locating a display device on a rail having an interface, said display device having a plurality of terminals, a combination of said terminals electrically connecting said device to said interface, said method comprising the steps of:

receiving a request for identification of location of said device on said rail; and sending a signal indicative of said combination of said terminals electrically connected to said interface in response to said request.

91. A method for use in a display system comprising a rail having an interface, one or more display devices which are mounted on said rail, each device being associated with a different address and including a plurality of terminals, said method comprising the steps of:

sending a request indicating an address associated with a particular device, a combination of the terminals of said particular device electrically connecting said particular device to said interface of said rail;

transmitting by said particular device in response to said request a message indicative of said combination of said terminals;

receiving said message transmitted from said particular device; and deriving from said message a position of said particular device on said rail.

92. The method of claim 91 further comprising the step of partitioning said rail into a plurality of slots, said particular device being mounted within a particular slot, said combination of said terminals being different from another combination of said terminals electrically connected to said interface when said particular device is mounted within a slot other than said particular slot.

93. The method of claim 91 wherein said terminals of each display device are evenly spaced, any two neighboring terminals on the display device being separated by a first distance, said method further comprising the step of mechanically engaging said display device with said rail in such a manner that said display device can only displace on said rail by distances which are integer multiples of said first distance.

94. A method for use in a display label having a plurality of sensors sensing information indicative of the position of the label on a rail, the method comprising the steps of:

sensing the information indicative of the position of the label;

storing the information;

sensing the information indicative of the position of the label;

comparing the sensed information with the stored information; and communicating a message externally from the label in the event of the sensed information differing from the stored information.

95. A method for use in a display system comprising a computer and a plurality of display labels, each label having a plurality of sensors sensing information indicative of the position of the label on a rail, the method comprising the steps of:

sensing the information indicative of the position of one of the labels;

storing the information within the computer;

sensing the information indicative of the position of the labels;

comparing the sensed information with the stored information; and making a record in the event of a difference between the sensed information and the stored information.

* * * * *